United States Patent [19]
Zavracky et al.

[11] Patent Number: 6,097,352
[45] Date of Patent: Aug. 1, 2000

[54] COLOR SEQUENTIAL DISPLAY PANELS

[75] Inventors: Matthew Zavracky, Plympton; Wen-Foo Chern, Wayland; Alan Richard, Wrentham; Ronald P. Gale, Sharon; Jack P. Salerno, Waban, all of Mass.

[73] Assignee: Kopin Corporation, Taunton, Mass.

[21] Appl. No.: 08/949,662

[22] Filed: Oct. 14, 1997

Related U.S. Application Data

[63] Continuation of application No. 08/409,321, Mar. 23, 1995, abandoned, which is a continuation-in-part of application No. 08/216,817, Mar. 23, 1994, Pat. No. 5,642,129.

[51] Int. Cl.[7] .................................................. G09G 5/00
[52] U.S. Cl. ........................................ 345/7; 345/8
[58] Field of Search .......................... 345/8, 9, 84, 88, 345/102, 7

[56] References Cited

U.S. PATENT DOCUMENTS

| | | | |
|---|---|---|---|
| 4,450,477 | 5/1984 | Lovett | 348/473 |
| 4,582,396 | 4/1986 | Bos et al. | 348/742 |
| 4,605,959 | 8/1986 | Colbaugh | 348/158 |
| 4,635,051 | 1/1987 | Bos | 345/32 |
| 4,695,129 | 9/1987 | Faessen et al. | 348/53 X |
| 4,758,818 | 7/1988 | Vatne | 345/151 |
| 4,843,381 | 6/1989 | Baron | 345/88 |
| 5,003,300 | 3/1991 | Wells | 340/705 |
| 5,040,058 | 8/1991 | Beamon, III | 345/8 X |
| 5,060,062 | 10/1991 | Dotson | 348/62 |
| 5,091,719 | 2/1992 | Beamon, III | 345/8 |
| 5,111,315 | 5/1992 | Ledebuhr | 359/40 |
| 5,113,181 | 5/1992 | Inoue et al. | 345/84 |
| 5,128,782 | 7/1992 | Wood | 309/48 |
| 5,142,388 | 8/1992 | Watanabe et al. | 345/88 |
| 5,189,512 | 2/1993 | Cameron et al. | 348/838 |
| 5,192,945 | 3/1993 | Kusada | 345/88 |
| 5,194,852 | 3/1993 | More et al. | 345/182 |
| 5,200,844 | 4/1993 | Suvada | 345/9 |
| 5,227,882 | 7/1993 | Kato | 348/571 |
| 5,233,338 | 8/1993 | Surguy | 345/88 |
| 5,243,455 | 9/1993 | Johnson et al. | 359/93 |
| 5,276,471 | 1/1994 | Yamauchi et al. | 345/8 |
| 5,337,068 | 8/1994 | Stewart et al. | 345/88 |
| 5,337,171 | 8/1994 | Mase et al. | 359/53 |
| 5,347,378 | 9/1994 | Handschy et al. | 359/53 |
| 5,404,437 | 4/1995 | Nguyen | 345/122 |
| 5,410,370 | 4/1995 | Janssen | 348/756 |
| 5,412,396 | 5/1995 | Nelson | 345/102 |
| 5,416,496 | 5/1995 | Wood | 345/102 |
| 5,416,514 | 5/1995 | Janssen et al. | 348/196 |
| 5,469,185 | 11/1995 | Lebby et al. | 345/8 |
| 5,491,510 | 2/1996 | Gove | 345/8 |
| 5,499,138 | 3/1996 | Iba | 359/569 |
| 5,539,578 | 7/1996 | Togino et al. | 359/630 |
| 5,581,271 | 12/1996 | Kraemer | 345/8 |

FOREIGN PATENT DOCUMENTS

| | | |
|---|---|---|
| 0 344 881 A2 | 2/1989 | European Pat. Off. . |
| 0 352 914 A2 A3 | 1/1990 | European Pat. Off. . |
| 0 492 721 | 7/1992 | European Pat. Off. . |
| 0 573 925 | 12/1993 | European Pat. Off. . |
| 4 338 927 | 11/1992 | Japan . |
| 06141308 | 5/1994 | Japan . |
| 2 222 923 | 3/1990 | United Kingdom . |
| 88/06391 | 8/1988 | WIPO . |
| 90/05429 | 5/1990 | WIPO . |

OTHER PUBLICATIONS

Janssen, P. "A novel single light valve hight brightness HD color projector," Society For Information Display Symposium, France Sep. 1993, Philips Laboratories, Briarcliff, USA p. 249–252.

*Primary Examiner*—Matthew Luu
*Attorney, Agent, or Firm*—Hamilton, Brook, Smith & Reynolds, PC

[57] ABSTRACT

An active matrix display panel is operated by a color sequential system to form color images. A color generator is disposed between a light source and the display panel for sequentially providing red, green and blue light. A color sequential drive circuit controls the color generator and the pixels of the display panel. The color generator is preferably a multi-stage multiple wavelength blocking filter incorporating fast switching surface stabilized liquid crystal cells.

20 Claims, 29 Drawing Sheets

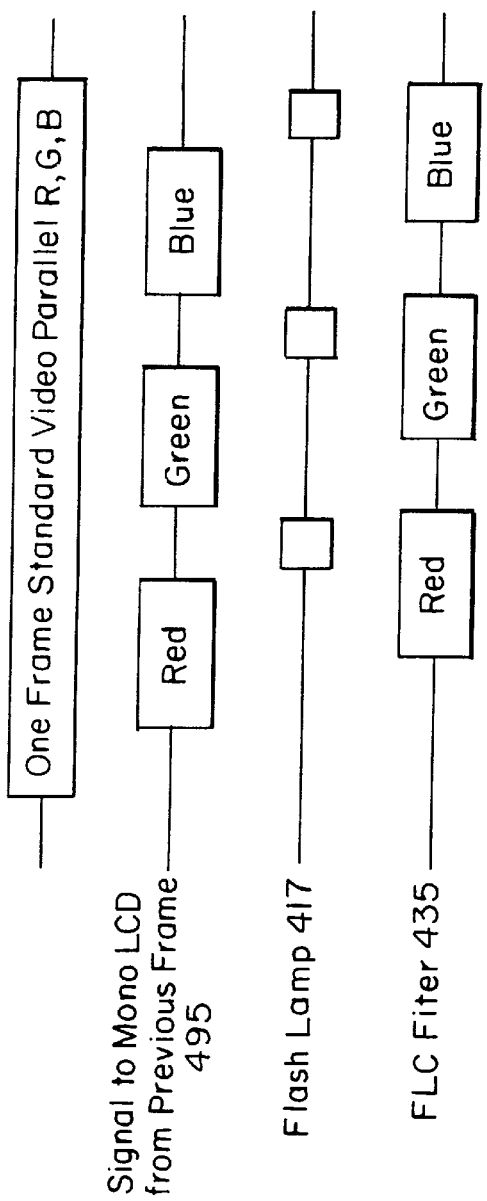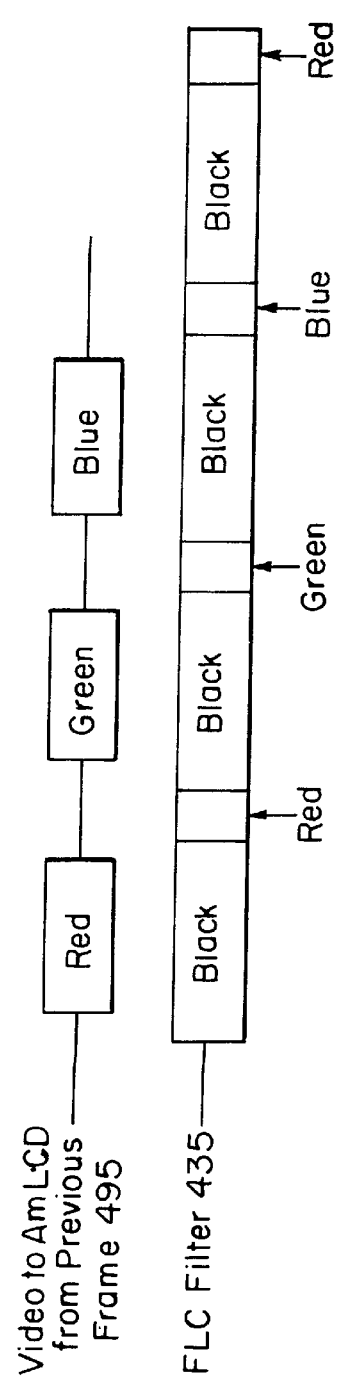

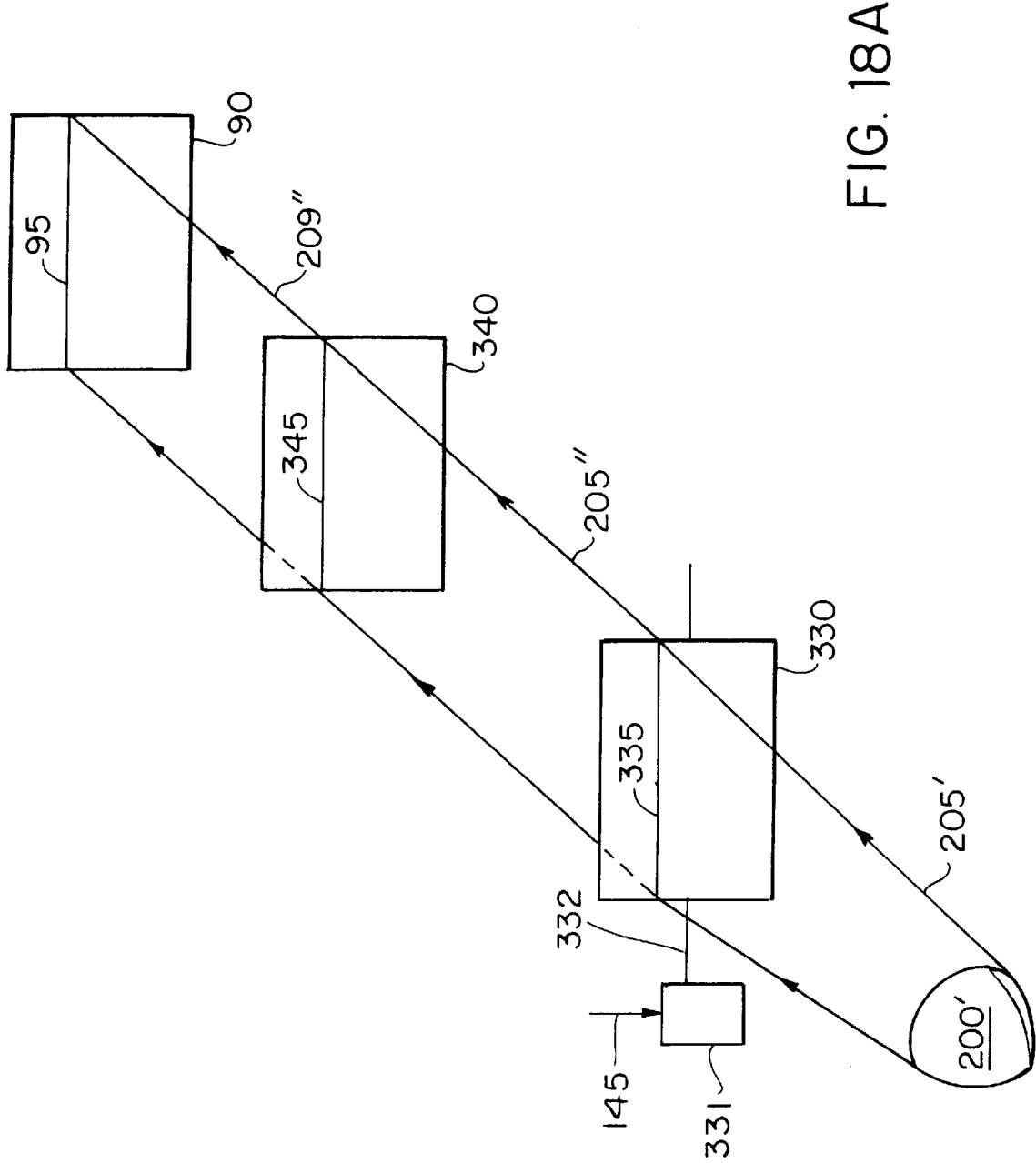

1340

| | |
|---|---|
| 24a | Black |
| 24b | Red |
| 24c | Black |
| 24d | Green |
| 24e | Black |
| 24f | Blue |
| 24g | Black |
| 24h | Red |
| 24i | Black |
| 24j | Green |
| 24k | Black |
| 24l | Blue |
| 24m | Black |
| 24n | Red |
| 24o | Black |

FIG. 20

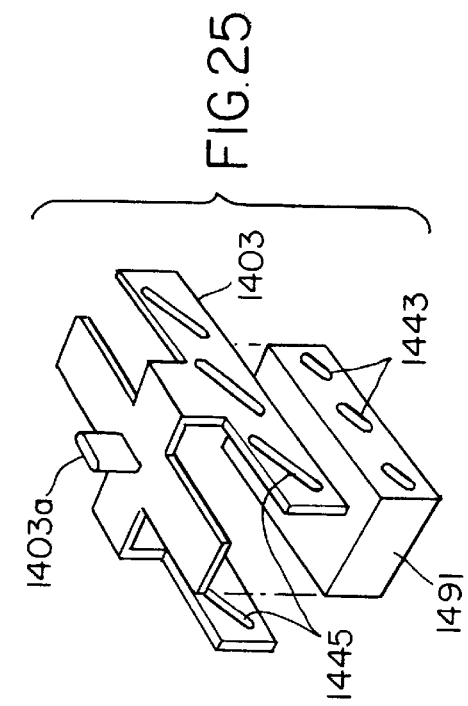
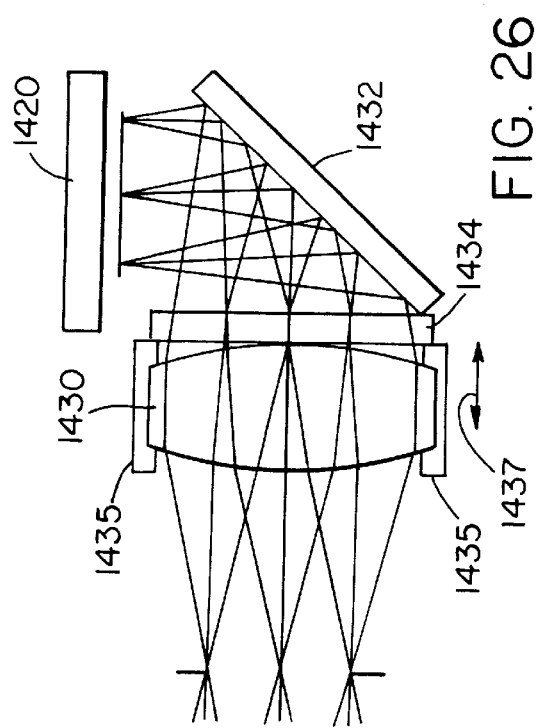
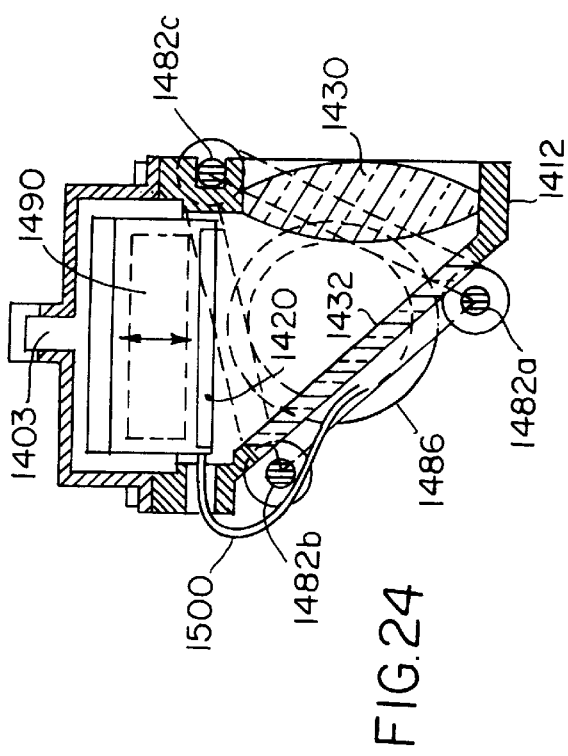
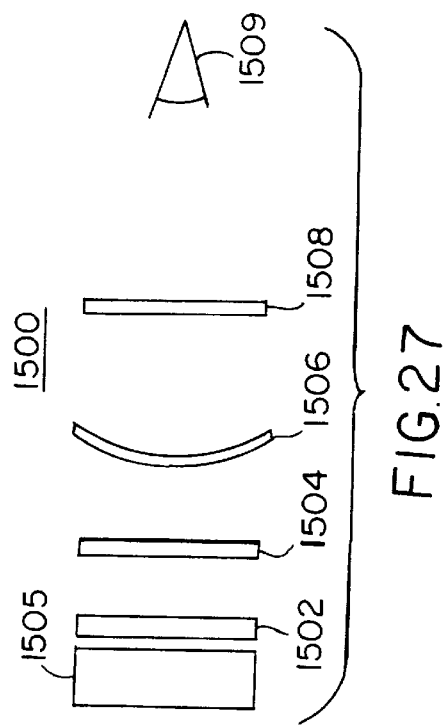

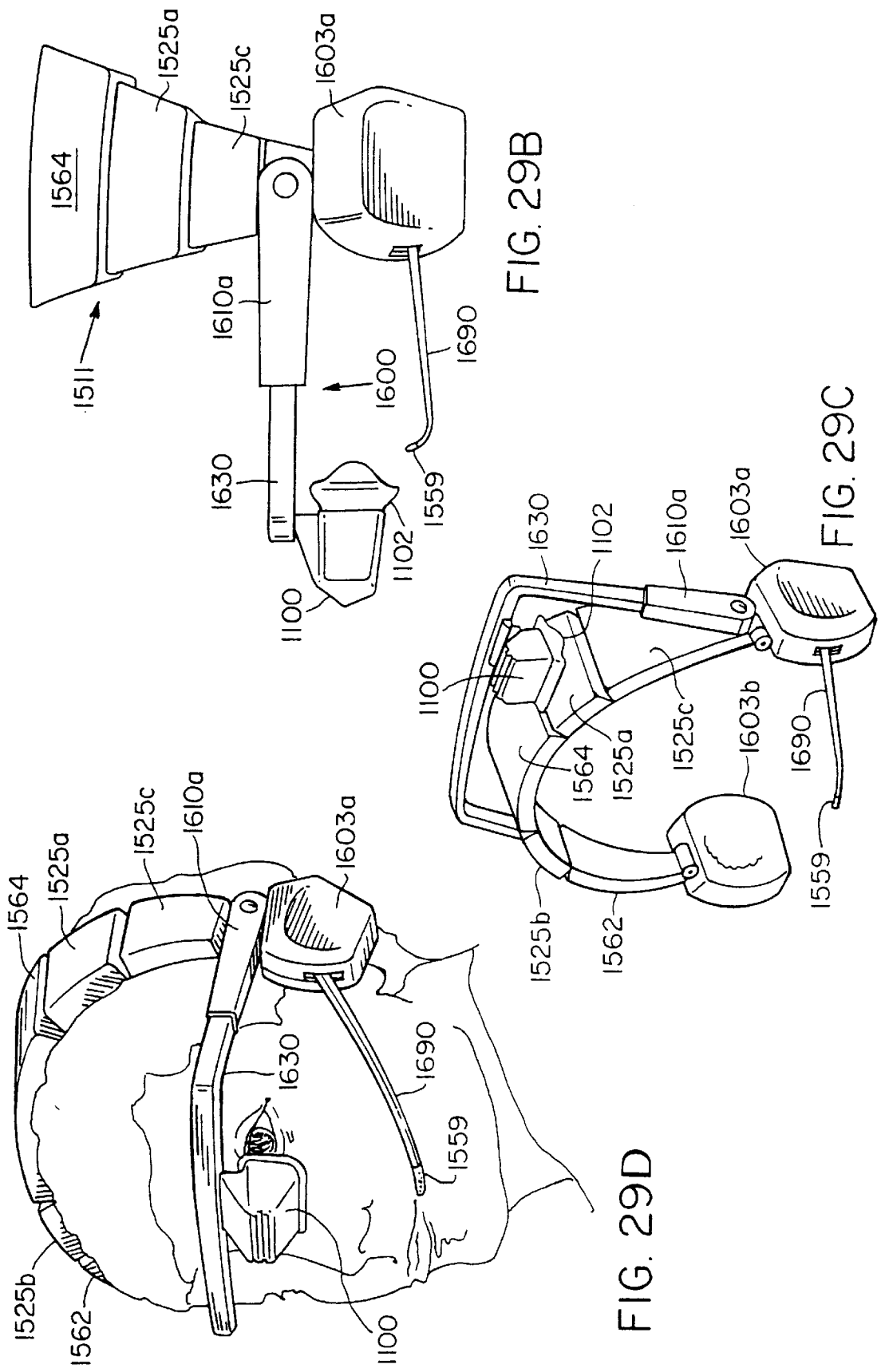

COLOR SEQUENTIAL DISPLAY PANELS

RELATED APPLICATIONS

This application is a continuation of application Ser. No. 08/409,321 filed Mar. 23, 1995, now abandoned, which is a continuation-in-part of Ser. No. 08/216,817, filed Mar. 23, 1994, now the U.S. Pat. No. 5,642,129.

BACKGROUND OF THE INVENTION

Flat-panel displays are being developed which utilize liquid crystals or electroluminescent materials to produce high quality images. These displays are expected to supplant cathode ray tube (CRT) technology and provide a more highly defined television picture or computer monitor image. The most promising route to large scale high quality liquid crystal displays (LCDs), for example, is the active-matrix approach in which thin-film transistors (TFTs) are co-located with LCD pixels. The primary advantage of the active matrix approach using TFTs is the elimination of cross-talk between pixels, and the excellent grey scale that can be attained with TFT-compatible LCDs.

Flat panel displays employing LCDs generally include five different layers: a white light source, a first polarizing filter that is mounted on one side of a circuit panel on which the TFTs are arrayed to form pixels, a filter plate containing at least three primary colors arranged into pixels, and finally a second polarizing filter. A volume between the circuit panel and the filter plate is filled with a liquid crystal material. This material will alter the polarization of light in the material when an electric field is applied across the material between the circuit panel and a ground affixed to the filter plate. Thus, when a particular pixel of the display is turned on, the liquid crystal material rotates polarized light being transmitted through the material so that the light will pass through the second polarizing filter.

The primary approach to TFT formation over the large areas required for flat panel displays has involved the use of amorphous silicon, which has previously been developed for large-area photovoltaic devices. Although the TFT approach has proven to be feasible, the use of amorphous silicon compromises certain aspects of the panel performance. For example, amorphous silicon TFTs lack the frequency response needed for large area displays due to the low electron mobility inherent in amorphous material. Thus the use of amorphous silicon limits display speed, and is also unsuitable for the fast logic needed to drive the display.

As the display resolution increases, the required clock rate to drive the pixels also increases. In addition, the advent of colored displays places additional speed requirements on the display panel. To produce a sequential color display, the display panel is triple scanned, once for each primary color. For example, to produce color frames at 20 Hz, the active matrix must be driven at a frequency of 60 Hz. In brighter ambient light conditions, the active matrix may need to be driven at 180 Hz to produce a 60 Hz color image. At over 60 Hz, visible flicker is reduced.

One such color sequential system has been described by Peter Jansen in "A Novel Single Light Valve High Brightness HD Color Projector," Society For Information Display (SID), Technical Paper, France 1993. In this system, dichroic filters are used to separate light from an arc lamp into three primary colors that are shaped into rectangular stripes which are sequentially scanned across a single light valve using a rotating prism. The control circuitry for this system was fabricated using discrete components for the active matrix, the column drivers and three commercially available random access row drivers mounted separately onto a glass panel with the column drivers and the active matrix. The active matrix was fabricated in poly-silicon and connected to the drivers using pin connections.

Owing to the limitations of amorphous silicon, other alternative materials include polycrystalline silicon, or laser recrystallized silicon. These materials are limited as they use silicon that is already on glass, which generally restricts further circuit processing to low temperatures.

A continuing need exists for systems and methods of controlling pixels and drive circuits of panel displays having the desired speed, resolution and size and providing for ease, and reduced cost of fabrication.

SUMMARY OF THE INVENTION

A preferred embodiment of the invention is an integrated circuit random access video display for displaying an image from a video source. An active matrix drive circuit and an active matrix display region are fabricated in a common integrated circuit module. The integrated circuit module can be formed in a silicon-on-insulator (SOI) structure that is transferred onto an optically transmissive substrate such as glass. A light box module translates a digital video signal into an active matrix drive signal. The active matrix display region has an array of pixel electrodes and an array of pixel transistors registered to the array of pixel electrodes. The pixel transistors actuate the pixel electrodes in response to the active matrix drive signal from the control circuit. The integrated circuit module can then be used to fabricate a liquid crystal display device for use in a projection display system or a head-mounted display system.

In particular, the control circuit includes one (or more) random access select scanner and a column driver. The select scanner can enable a row of pixel transistors at random. The column driver can provide actuation signals to the transmission gates that allow video data to flow into the enabled pixel transistors. Timing information for the select scanner and the column driver is provided by a control signal generator, which is also fabricated in the integrated circuit module. The circuit module can also include a video memory, D/A converters, and at least one frame buffer for storing at least one video signal from digital data representing the video image. In a particular preferred embodiment, the display generates color images and there is a frame buffer for the digital data, associated with each primary color (e.g., red, green, blue). In another preferred embodiment, the frame memory is partitioned into channels. The column driver preferably actuates individual pixel electrodes that can be randomly selected by the control circuit.

In a preferred embodiment of the invention, the video source is any analog or digital video source including a computer, television receiver, high-definition television (HDTV) receiver or other similar sources. In particular, the active matrix display region is compatible with HDTV formats and is a 1280-by-1024 pixel array. The pixels have a pitch that is preferably in the range of 10–55 microns such that multiple integrated circuit modules can be fabricated on a single five inch wafer.

In a particular preferred embodiment, the control circuit generates compressed video data to obtain further bandwidth reductions. As such, only pixels whose data value has changed since the last video frame needs to be updated. Preferably, the control circuit is compatible with standard active matrix drive techniques.

As referenced above, a preferred embodiment of the invention includes a process of fabricating an active matrix display in which a circuit is fabricated with an SOI structure and then transferred onto an optically transmissive substrate. The pixel electrodes can be fabricated prior to transfer using processes described in U.S. Pat. No. 5,206,749 entitled "Liquid Crystal Display Having Essentially-Single Crystal Transistors Pixels and Driving Circuits," the teachings of which are incorporated herein by reference. The pixel electrodes can be made of a transmissive silicon material or a conductive metal oxide such as indium tin oxide. The pixel electrodes can also be formed after transfer of the circuit and connected through the insulator as described by Vu et al. in U.S. Pat. No. 5,256,562 entitled "Method For Manufacturing A Semiconductor Device Using a Circuit Transfer Film," the teachings of which are incorporated herein by reference. Other methods for fabricating pixel electrodes are described by Zavracky et al. U.S. Ser. No. 08/215,555 filed on Mar. 21, 1994 and entitled "Methods of Fabricating Active Matrix Pixel Electrodes," the teachings of which are incorporated herein by reference.

BRIEF DESCRIPTION OF THE DRAWINGS

The above and other features of the invention, including various novel details of construction and combination of parts, will now be more particularly described with reference to the accompanying drawings and pointed out in the claims. It will be understood that the particular color sequential display panels embodying the invention is shown by way of illustration only and not as a limitation of the invention. The principles and features of this invention may be employed in varied and numerous embodiments without departing from the scope of the invention.

FIGS. 12A–12B are schematic timing diagrams for the color shutter systems of FIG. 8.

FIGS. 18A–18B are schematic diagram illustrating another preferred embodiment of the invention employing a rotating prism.

FIG. 20 is a schematic elevational view of pixel rows in a color sequential LCD display.

FIG. 24 is a cross-sectional view of an optics module housing for a head mounted display.

FIG. 25 is a perspective view of a sliding ramp system for the housing.

FIG. 26 is an alternative embodiment for the optical system of a color sequential head mounted display.

FIG. 27 is another preferred embodiment of a color sequential head mounted optical system.

FIGS. 29A–29D are perspective and side views of a head mounted computer system having a monocular color sequential display.

DETAILED DESCRIPTION OF PREFERRED EMBODIMENTS OF THE INVENTION

Figure 1:
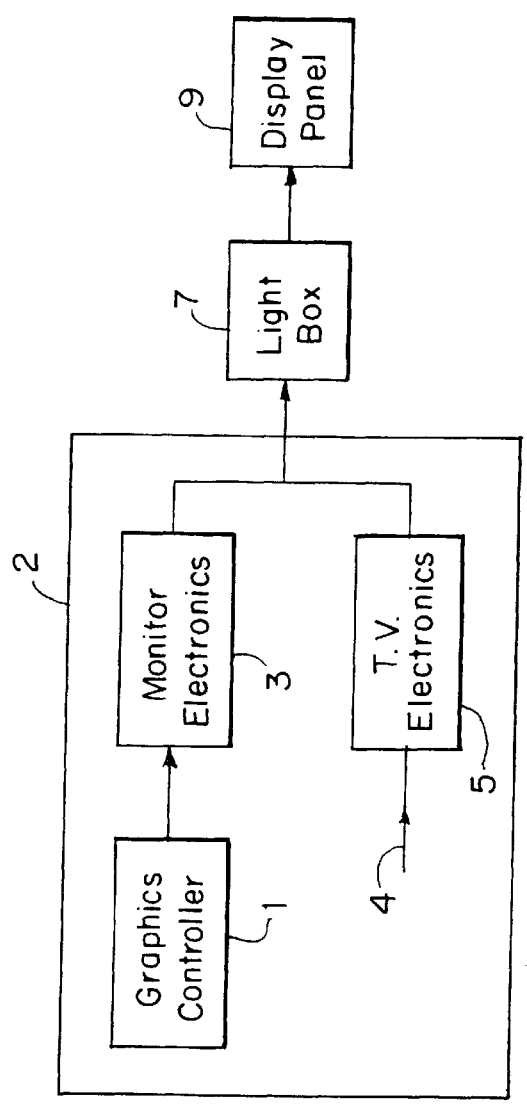
FIG. 1 is a block diagram of a control system for a color active matrix display.

A preferred embodiment of a control system for a color active matrix display is shown in FIG. 1. A video signal adaptor 2 provides color video signals to a light box module 7. The video signal adaptor 2 can include any analog or digital video signal source 1,4 including a Video Graphics Array (VGA) adaptor, the Apple™ Macintosh™ family of computers, a National Television Systems Committee (NTSC) composite video source, a High-Definition Television (HDTV) receiver, a high-resolution professional display adapter, a Charge-Coupled-Device (CCD), a PAL video source, a SECAM video source, or other similar sources. As illustrated, the work station or computer-generated video signals from a graphics controller 1 are processed by a monitor electronics module 3 to provide the color video signal, typically a 24-bit RGB signal with Hsync and Vsync information, to the light box 7. Similarly, television broadcasts 4 are processed by a television electronics module 5 to provide the color video signal to the light box module 7. In a particular preferred embodiment, an active matrix display panel 9 is adapted as a computer-controlled light valve that displays color images to a viewer. The images can be displayed directly to the viewer or by projection onto a viewing surface. In a particular preferred embodiment, the light valve is part of a head-mounted display (HMD) device.

Flat panel displays have pixels where the analog RGB signal must contain information on screen position. For the position information to be accurate, each scan line of the analog RGB signal must be divided into discrete values. That task is performed by the video signal adaptor 2, which provides digital color data for each pixel.

The active matrix display panel 9 operates as a variable multi-frequency display device. Video signals from the video signal source may not be synchronized to a known fixed frequency. A change in the video mode can change the resolution of the data, measured in pixels. For example, a VGA adaptor 1 generates synchronization signals that vary depending on the particular video mode in which the adaptor is operating. A standard VGA adaptor 1 can generate a vertical synchronization (Vsync) frequency between about 56 and 70 Hz and a horizontal synchronization (Hsync) frequency between about 15 and 35 Khz. For professional display purposes (e.g., CAD/CAM) the Hsync and Vsync frequencies can be higher than described. To handle current high resolution display applications, the display device can preferably adapt to Vsync frequencies up to about 100 Hz and horizontal synchronization frequencies up to about 66 Khz. In addition, a change in the video mode can also invert the polarities of the synchronization signals. Consequently, a preferred embodiment of the invention adapts to changes in the synchronization signals caused by changes in the video mode.

Figure 2:
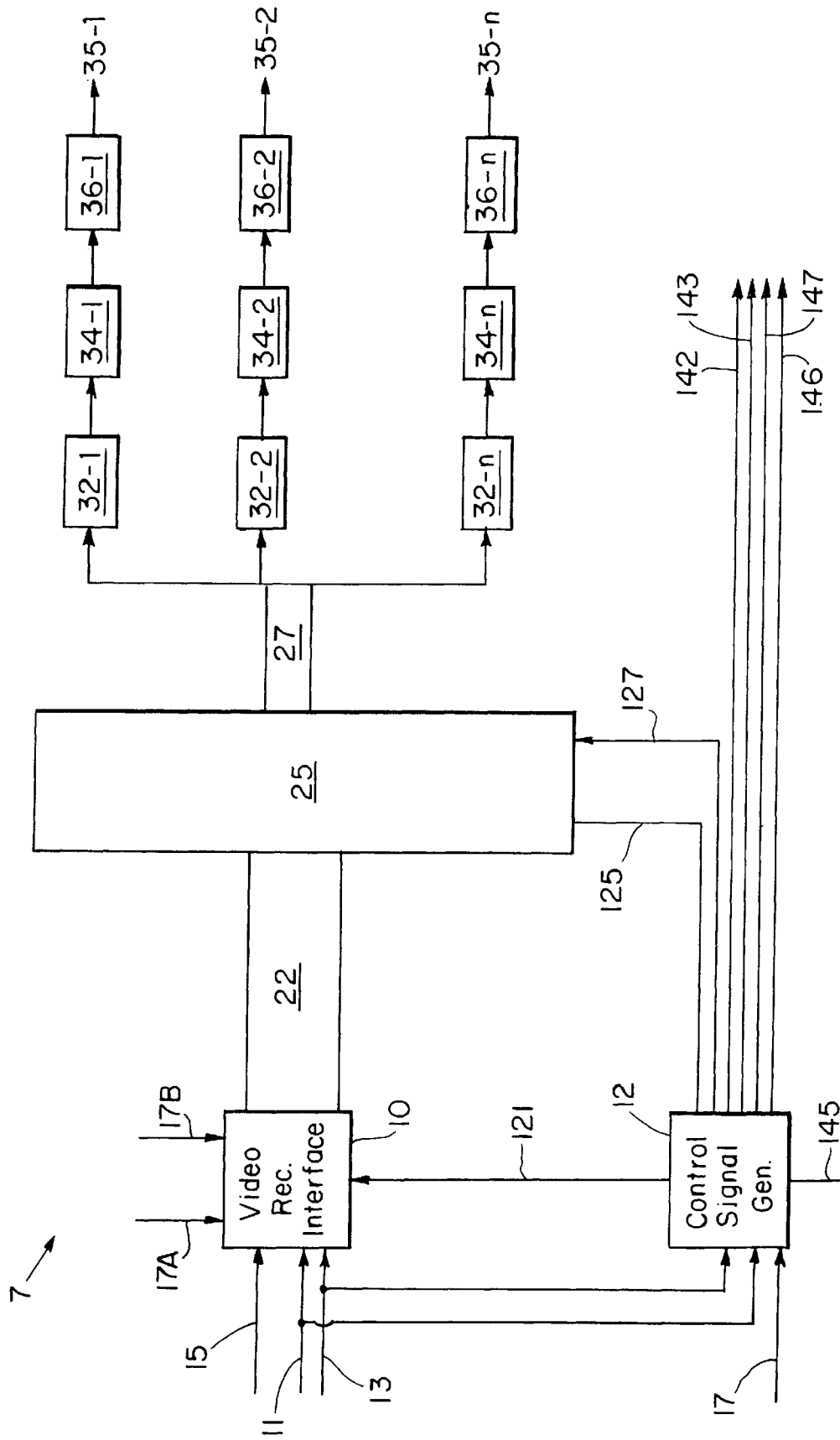
FIG. 2 is a block diagram of the light box circuitry 7 of FIG. 1.

FIG. 2 is a block diagram of the light box module 7 of FIG. 1. The light box module 7 receives the Hsync signal 11, the Vsync signal 13 and a color data signal 15, which is typically operating at 300 MHz from the video signal adaptor 2. In a preferred embodiment of the invention, the color data signal 15 represents the color of each pixel as a 24-bit digital value. The video signals 11,13,15 are received by a video receiver interface 10, which formats the color data signal 15 for storage in a video frame memory 25. In particular, the video receiver interface 10 converts the serial color data input stream 15 into parallel data 22 for storage in the video frame memory 25. The Hsync signal 11 and the Vsync signal 13 are also provided to a control signal generator 12.

The control signal generator 12 generates control signals for operating the active matrix display panel 9 in response to the Hsync 11 and Vsync 13 signals from the video signal source 2. In a preferred embodiment, the control signal generator 12 permits display of video images at a horizontal resolution of at least 640 pixels and a vertical resolution of at least 480 pixels (640H×480V). In a preferred embodiment of a HMD, the image resolution is at least 1280H×1024V.

In another preferred embodiment, the aspect ratio of the active matrix display panel 9 is selected to be compatible with High-Definition Television (HDTV) formats, such as 1920H×1080V, 1824H×1026V and 1600H×900V. Furthermore an HDTV-compatible 1280H×720V image can be formed in a 1280H×1024V display or a 1280H×1024V image can be formed in an 1824H×1026V or 1920H×1080V display. It is understood that other video modes having different video rates and resolutions can be supported as well, with minor modifications.

Figure 3:
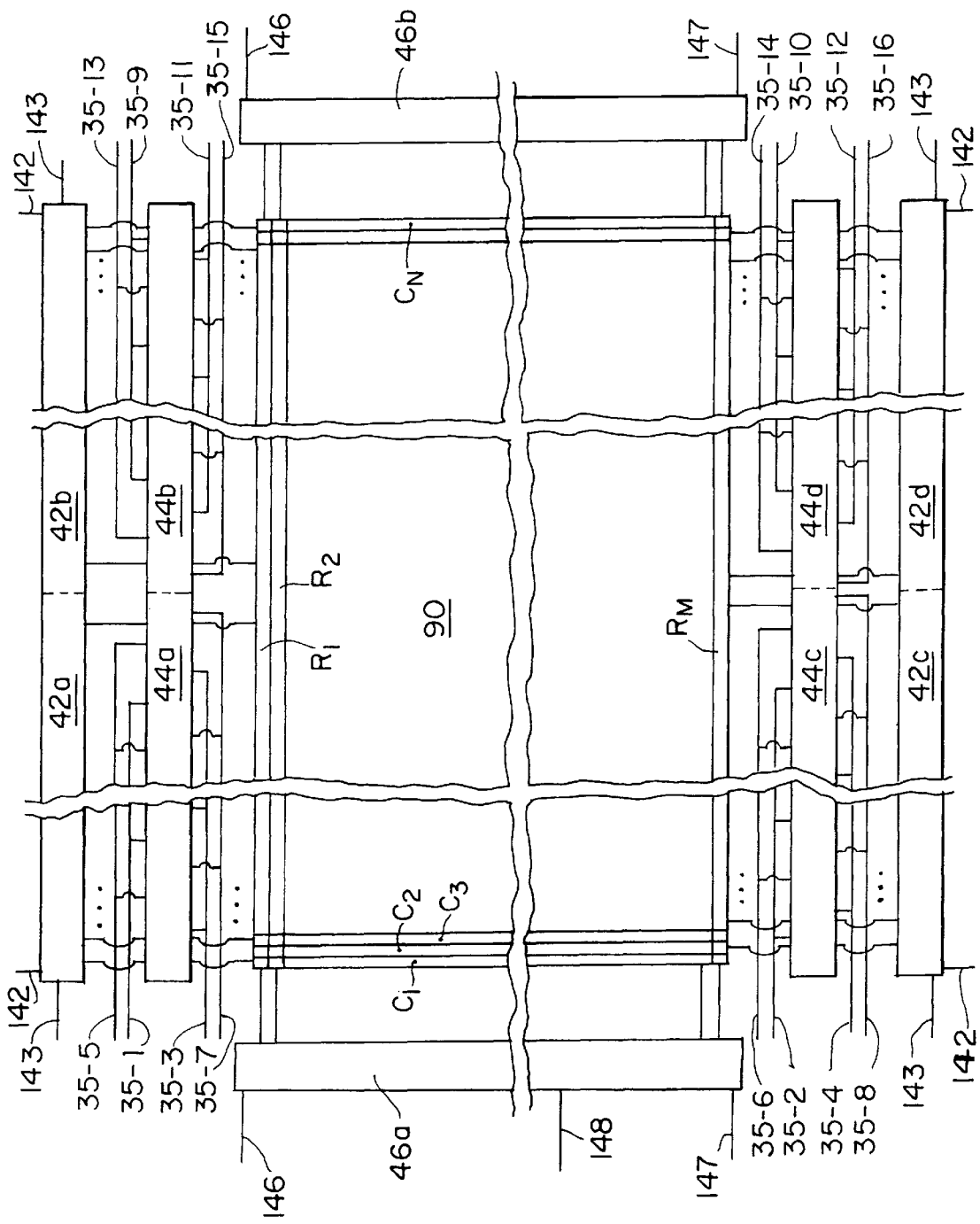
FIG. 3 is a schematic block diagram of a display panel drive circuit.

The control signal generator 12 converts the synchronization signals 11,13 into pixel timing information for the pixel columns and select line timing information for the pixel rows of the active matrix. The control signal generator 12 provides control registers to adjust and delay the pixel clock 143, pixel data 142, select clock 147, and select data 146 so the image generated by the video source 1,4 (e.g. VGA, HDTV) can be precisely mapped to the active matrix pixel resolution (e.g., 640H×480V; 1280H×1024V). The control signal generator 12 provides a pixel data signal 142 and a pixel clock signal 143 to a data scanner 42 (FIG. 3). The video signal generator 12 also provides a select line data signal 146 and a select line clock signal 147 to select scanners 46 (FIG. 3). The control signal generator 12 also receives and operates according to user control signals.

Preferred embodiments of the invention supply one or four clocks for each clock signal 143,147. By supplying multiple clocks for each clock signal 143,147, the circuitry of the scanners 42,46 can be simplified. This is especially important where the scanners 42,46 are monolithically fabricated on an SOI structure with the active matrix region 90 and the light box module 7 is a discrete component.

Furthermore, the control signal generator 12 provides a frame switch signal 121 to the video receiver interface 10. The data scanner clock and data pulse rate is determined by the number of parallel video input channels. The data scanner can scan sequentially, or alternatively, it can use a random access procedure. Note that in another embodiment, the select data 146 or select clock 147 can be used as a serial address line.

Because the video data is received in digital form, the video receiver interface 10 can generate normal or inverted video data signals in response to the frame switch signal 121 from the video signal generator 12. Preferably, the polarity of the video signal is switched every video field (every Vsync). The switch can occur more or less often, as might be desirable to inhibit crosstalk or other purposes. The frame switch signal 121 is synchronized to the frame rate.

In a preferred embodiment, a column inversion technique is used to reduce crosstalk between select lines to reduce or avoid the production of a DC offset voltage. A video switch provides an alternating opposite polarity for the column pixels. The even column pixels are operated at the opposite polarity of the odd column pixels. The polarities of the column pixels are switched on each sequential frame. For example, on one frame even column pixels operate at a positive polarity and odd column pixels operate at a negative polarity relative to the display common electrode. On the next sequential frame, the polarities of the odd and even columns are switched. As a result, the even column pixels operate at a negative polarity and the odd column pixels operate at a positive polarity.

Another preferred embodiment of the invention uses a frame inversion technique instead of column inversion. Using frame inversion, each column during any one frame has the same polarity. On alternating frames, as clocked by the frame switch signal 121, the polarity of each column is reversed. In that way, the polarity of the entire active matrix region 90 (FIG. 3) is inverted on each successive frame. This frame inversion embodiment does not require the use of distinct odd and even data registers or video drive lines. Other preferred embodiments are row inversion or pixel inversion techniques.

The control signal generator 12 can also adapt the writing of each line. For example, in a preferred embodiment of the invention the image is written for each select line from the edges of the display panel 9 toward the center of the display panel 9. Another preferred embodiment writes the video data from the center of the display panel 9 outward toward the edges. In yet another preferred embodiment, the video data is scanned left to right across the display panel. Each column of the display can also be randomly accessed. These various video data writing techniques are provided under the control of the control signal generator 12.

In a preferred embodiment of the invention, the display panel 9 is driven at 60 Hz frame rate. During each frame, the display panel 9 is overwritten with data for the three primary colors (e.g., RGB). Consequently, there are 180 subframes displayed per second. This produces a pixel data rate of about 300 Mhz. Because the video data must be in digital form to be stored in memory for time compression, it must be converted to analog signal by digital to analog converters (DACS). However, it would require a super-high speed DAC to operate at 300 Mhz. Consequently, a preferred embodiment of the invention separates the video signal into n channels. The number of channels is a design decision where an increase in the number of channels becomes more difficult to manage while the operating speed of the DACs is lowered. Preferably, there are sixteen (n=16) channels of video data and each channel has its own DAC operating at one-sixteenth of the total pixel data rate.

Accordingly, the video receiver interface 10 partitions the incoming video data signal 15 into channels of video data. Each channel carries video data at an offset from the edge of the panel so that the channels stagger the video data for the pixels across the display. For example, with the number of channels being 16 (n=16), the first channel can carry data for every 16th pixel starting from the left-most pixel ($C_1$, $C_{17}$, $C_{33}$, . . . ) and the second channel can carry data for every 16th pixel starting form the second left-most pixel ($C_2$, $C_{18}$, $C_{34}$, . . . ), etc. The offset for each channel can be selected by the video receiver interface 10.

The video data are fed through an input bus 22 to a video frame memory 25. The video frame memory 25 is addressed by an addressing signal 125 from the control signal generator 12.

An output bus 27 delivers the addressed video data from the video memory 25 to a line memory 32 for each channel. A DAC 31-1, . . . , 34-n for each channel reads the video data from the line memory 32, converts the digital video data to an analog video signals input to the panel drive circuit. The analog video signals are amplified by output amplifiers 36-1, . . . , 36-n to yield video drive signals 35-1, . . . , 35-n which are used to drive the columns 44 of the display panel 9.

The data supplied from the output bus 27 at any one time is either red data from a red frame buffer, or green data from a green frame buffer, or blue data from a blue frame buffer. The appropriate data value is provided via the output bus 27 by the output color select signal 127 from the control signal generator 12.

In a preferred embodiment where the inputs are red, green, and blue data, the color select signals 127 are two-bit data signals. The chosen data value for each channel is converted back into an analog video signal by the channel DAC 34. Each output amplifier 36 amplifies the analog video signal to levels required to drive the LCD circuitry.

The video receiver interface 10 can also receive control interface signals from a user at 17A for adjusting hue, contrast, and brightness and at 17B for inversion, gamma correction and liquid crystal voltage offset. Except for hue, these control interface signals can instead be received by the output amplifiers 36-1, . . . , 36-n.

The drive circuitry can incorporate gamma corrections and shading corrections as noted above. Gamma corrections may be required for each primary color if the electro-optical transfer characteristic (transmission vs. pixel voltage) in the liquid crystal varies with wavelength. Shading correction may be required to compensate for the length of time that an image row is displayed on the panel 9. The drive circuitry can also incorporate inversion techniques and offsets.

FIG. 3 is a schematic block diagram of the active matrix drive circuitry. A video signal bus 35 carries the analog video signals from the DAC amplifiers 36 to the column drivers 44. Because signal interference and signal loss can occur as the analog video signal crosses each signal line in the signal bus 35, the channels of video signals are arranged to reduce interference. As illustrated, there are four column drivers 44a–44d, two column drivers 44a,44b at the top of the active matrix region 90 and two column drivers 44c,44d at the bottom of the active matrix region 90. Each channel is allocated to one of the column drivers 44 such that each column driver 44 receives video from four channels. As illustrated, the top column drivers 44a,44b receive video from the channels that drive the odd-numbered columns and the bottom column drivers 44c,44d receive video from the channels that drive the even-numbered columns. As shown, no video signal has to cross the path of more than one other video signal.

The illustrated arrangement of column drivers is particularly suited for edge-to-center and center-to-edge video writing, although the data can also be written from left-to-right or right-to-left. It should be understood that more or less than four column drivers 44 can be employed in preferred embodiments of the invention.

The data scanners 42 are responsive to the pixel data signal 142 and the pixel clock signal 143. The data scanners 42 can use a shift register array to store data for each scan. An odd shift register array can be used to store data to odd column pixels and an even shift register array can be used to store data to even column pixels. As illustrated, there are left and right odd data scanners 42a,42b and left and right even data scanners 42c,42d.

The column drivers 44 selected by the data scanner 42 will transmit video data to a selected column C in the active matrix region 90. The select scanner 46 determines by control lines which pixels accept this column data.

To reduce signal loss across the active matrix region 90, the select lines are driven from both sides by select scanners 46. As viewed in FIG. 3, a left select scanner 46a and right select scanner 46b are connected to the select data line 146 and the select clock line 147. A third enabling line 148 can also be used after specific applications. The left select scanner 46a provides a select line signal at the end of the select line nearest the lowest-valued pixel column ($C_1$) and right select scanner 46b provides a select line signal at the end of the select line nearest the highest-valued pixel column ($C_N$). Thus, an identical select line signal is supplied at both ends of the select line.

Although static shift registers can be used, the shift registers of the data scanner 42 and the select scanners 46 are implemented as dynamic shift registers. The dynamic shift registers rely on capacitor storage without leakage. However, dynamic shift registers are susceptible to leakage, especially when they are exposed to light. Hence, light shields are needed to protect the scanners 42,46 from exposure to light. Similarly, light shields are also used to protect the transmission gates 44 and pixels.

In another preferred embodiment of the invention, the select scanners 46 are random access select scanners. Each random access select scanner can be addressed to drive any row of pixels during any pixel clock period. As such the select scanners 46 need not include shift registers. The select line is directly provided by the row select signal 146, which is implemented as an address bus.

In another preferred embodiment of the invention, the data scanner 42 is a random access data scanner to select any column of pixels for any clock period. When used in conjunction with random access select scanners, the light box module 7 can actuate any pixel on the active matrix region 90 during any pixel clock period. This embodiment requires the use of double gate pixel transistors for receiving two digital select inputs (row select and column select) to signal pixel actuation with the video signal for the selected pixel. With a fully random access active matrix region 90, data compression techniques with burst mode refresh of the video frame memory 25 can be used to write changed pixels to the display.

In a preferred embodiment of the invention, the panel drive circuitry of FIG. 3 is fabricated as an integrated circuit with the active matrix region 90. The integrated circuitry is preferably fabricated in single crystal silicon having a silicon-on-insulator (SOI) structure using the fabrication and transfer procedures described previously. By fabricating the row and column drive circuitry 42,44,46 in single crystal with the active matrix region 90, the size of the display panel is not constrained by the connecting pins for the various discrete components. The integrated fabrication also increases the operating speed of the display over displays constructed from discrete components. Furthermore, the drive circuitry can be optimized to increase display performance. For example, it is easier to construct a 35 mm format-compatible 1280H×1024V display panel with dual select scanners through integrated fabrication than it is using discrete components.

The pixels in a preferred embodiment are approximately 24 microns square. Consequently, a 1280H×1024V active matrix with the control system can be fabricated such that there are two such integrated circuits on a four inch wafer, four circuits on a five inch wafer and six circuits on a six inch wafer. In another preferred embodiment of the invention, the select scanners 46, the data scanner 42 and the column driver 44 are integrated on chip with the active matrix region 90.

Figure 4:
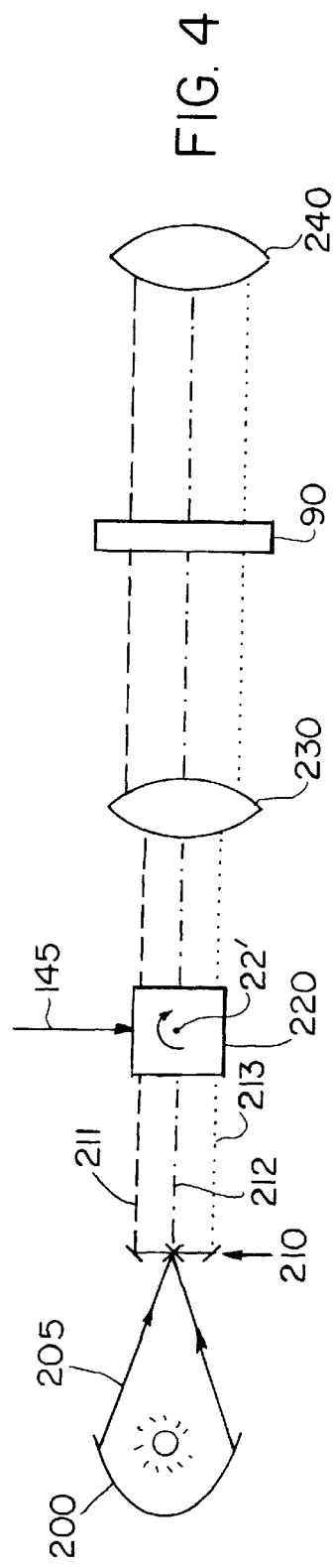
FIG. 4 is a schematic diagram illustrating a preferred embodiment of a color sequential display system using a scanning prism.

FIG. 4 is a schematic diagram illustrating a preferred color sequential display system according to the invention. As illustrated, a light source 200 having a reflector generates a beam of white light 205 that is focused on a dichroic mirror assembly 210. The dichroic mirror assembly 210 separates the white light 205 into three parallel strips of primary color light 211,212,213 separated by unlit black bands 214. Preferably, the primary color light is red light 211, green light 212, and blue light 213. The strips of red, green and blue light become incident on a prism 220 which is rotatably about a center axis 22' under the control of the drive signal 145 from the control system of FIG. 2. The prism 220 is rotated such that the color strips 211, 212, 213 scan vertically downward relative to the figure.

Figure 5A:
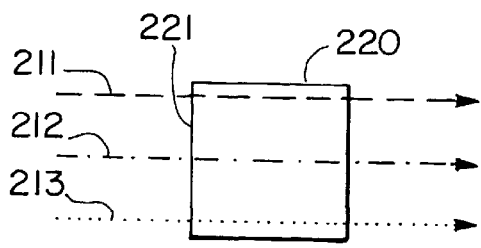
FIGS. 5A–5C are views of the scanning prism 120 of FIG. 3 illustrating color scanning.
Figure 6A:
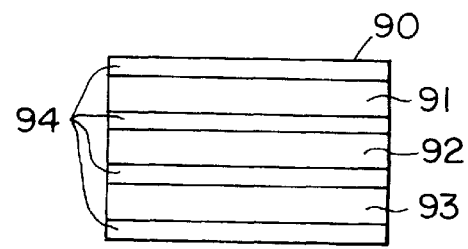
FIGS. 6A–6C are views of the active matrix display 90 of FIG. 3 corresponding to the color scanning of FIGS. 5A–5C.
Figure 5B:
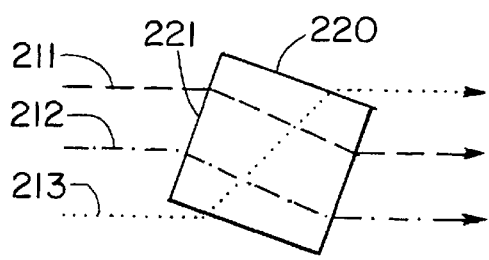
Figure 6B:
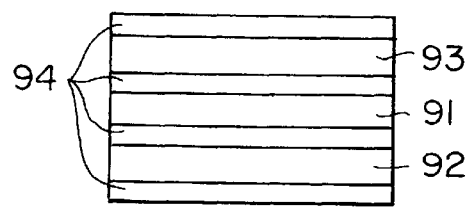
Figure 5C:
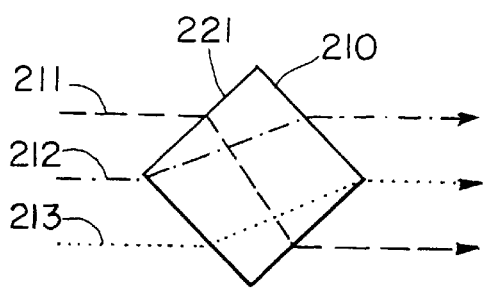

FIGS. 5A–5C are views of the rotating prism 220 of FIG. 4. The prism acts as a tilted parallel plate to move the color stripes as it rotates. When the facing surface 221 is perpendicular to the incident light rays (FIG. 6A) the light rays are passed directly through the prism 220. As the prism is rotated, the facing surface 221 becomes tilted relative to the incident rays (FIG. 6B). The bottom color stripe 213 is scrolled to the top position and the other color stripes 211,212 are scrolled downward. This process is continued in FIG. 5C. Each time a color stripe reaches the bottom, rotating of the prism 220 redirects the color stripe to the top from where the stripe repeats its downward motion.

Returning to FIG. 4, a field lens 230 can be used to align the color stripes exiting from the rotating prism 220 with the active matrix display 90. Using the scanning prism 220, every part of the light valve is exposed equally with rapidly alternating colors and the full spectrum of the light source 200 is utilized at all times. Immediately after a color stripe passes a row of pixels, refresh begins with picture information pertaining to the next color. The prism 220 inherently produces dark bands between the RGB color stripes which accommodate the finite response time of the light valve.

Figure 6C:
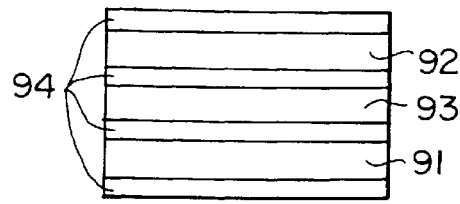

A projection lens 240 can be used to project the image generated on the active matrix region 90 to a user. The active matrix region 90 must be addressed and supplied with video information consistent with the scrolling illumination. To this end, the active matrix region 90 is partitioned into three equal height segments as shown in the views of FIGS. 6A–6C.

Each segment is scanned by the row drivers 46a,46b (FIG. 3). The row drivers 46a,46b can be enabled sequentially in a fixed top-middle-bottom order. However, the row drivers 46a, 46b can also implement non-linear scanning. The control signal generator 12 also accommodates non-linear scanning, which is a function of the rotating prism (and liquid crystal speed). The liquid crystal speed can vary due to temperature wavelength. The control signal generator 12 compensates for any liquid crystal speed variations when producing control signals.

Timing is programmed such that active rows closely track the illumination pattern in each segment. The video data, written to the independent RGB frame buffers 25-xR, 25-xG, 25-xB is retrieved under control of the color select signal 127 offset by one-third of the display height. The RGB data are first time compressed and then line-by-line multiplexed into the serial format required by the column driver 44. FIGS. 6A–6C illustrate the color segments 91,92, 93 corresponding to the red stripe 211, green stripe 212 and blue stripe 213 as scrolled in respective FIGS. 5A–5C. The color stripes 91, 92, 93 are separated by black stripes 94.

By using color stripes, the duty cycle of the available light incident on the display can be maximized. Additionally, there is reduced variation in the brightness from the top to the bottom of the display because each line is active with each color for exactly the same amount of time. This is not true with color schemes that change the color of the entire display after writing a frame of data where two of the colors have been removed from light being transmitted through the light valve at any one time.

Figure 7:
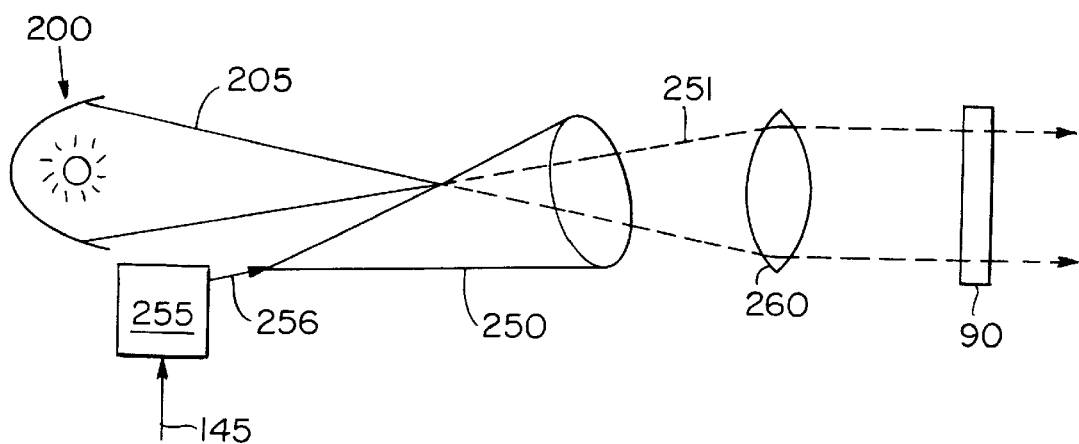
FIG. 7 is a schematic diagram of a preferred embodiment of a color sequential display system using a rotating cone.

FIG. 7 is a schematic diagram of a preferred color sequential system using a rotating color cone. A light source 200 having a reflector generates a white light 205 focused on a cone 250. The cone 250 is divided into three equal segments, one red, one green, and one blue. As the white light 205 becomes incident and passes through the color cone 250, an expanding beam of color light 251 is produced. The color of the colored light 251 is dependent on the color of the cone segment transmitting the light. The color light 251 is focused by a field lens 260 into parallel rays of light which are transmitted through the active matrix region 90.

The color cone 250 is rotated by a motor 255 coupled to the cone 250 by an axle 256. The motor is synchronized to the frequency of the drive signal 145 from the video signal generator 12 of FIG. 2. The color select signal 127 is also synchronized to the retention of the cone 250 to provide data from the red buffer 25-xR, green buffer 25-xG and blue buffer 25-xB in sequence to the column driver 44.

Figure 8:
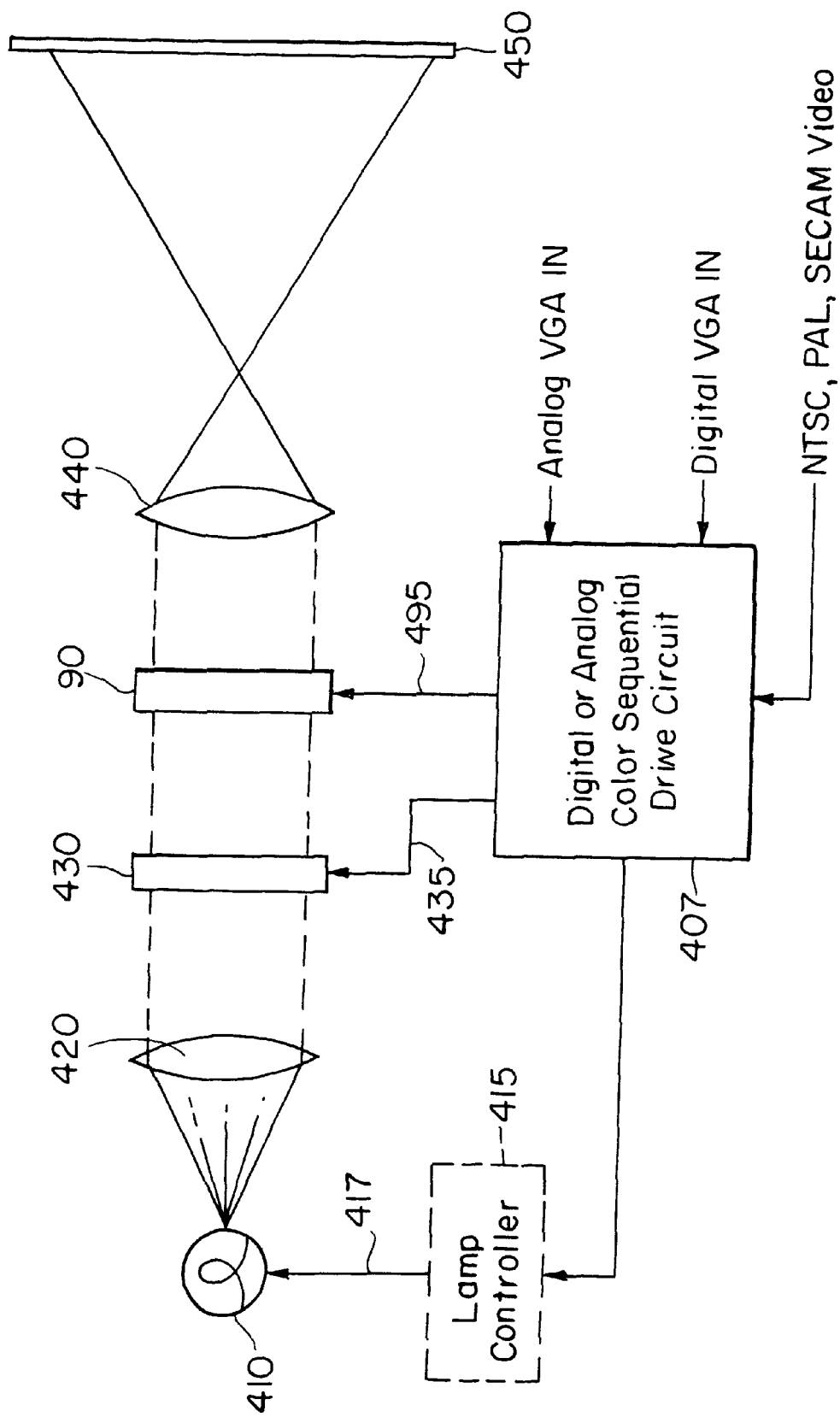
FIG. 8 is a schematic block diagram of a color shutter display system.

FIG. 8 is a schematic block diagram of a color shutter display system. Illustrated is a color sequential drive circuit 407, which accepts VGA input in either analog or digital form and other standard or proprietary video inputs. The drive circuit 407 itself can be either digital or analog as will be described in detail below.

A lamp 410 projects white or RGB light through a field lens 420. The lamp 410 can either be a continuous light source or a flashing light source. The light output from the field lens 420 is collimated on an electronic color filter system 430.

The drive circuit 407 controls the color filter system 430 over a color signal bus 435. Under the control of the drive circuit 407, the color filter system 430 passes either red, green or blue light. In certain applications, it is advantageous for the color filter system 430 to also block all light.

The filtered light from the color filter system 430 is collimated on an active matrix LCD 90. Preferably, the color filter system 430 is transferred from a substrate and epoxied to the LCD 90 to form a single module. Alternatively, the color filter system 430 can be transferred and epoxied to the field lens 420 or elsewhere in the optical path. The active matrix LCD 90 is controlled by the drive circuit 407 over a data bus 495 to form an image. The image formed on the active matrix panel 90 is projected by an output lens 440 onto a viewing surface 450, which may be a projection screen or rear projection Fresnel lens. The output lens 440 can also be a viewing lens for use in direct viewing of the active matrix image.

Figure 9:
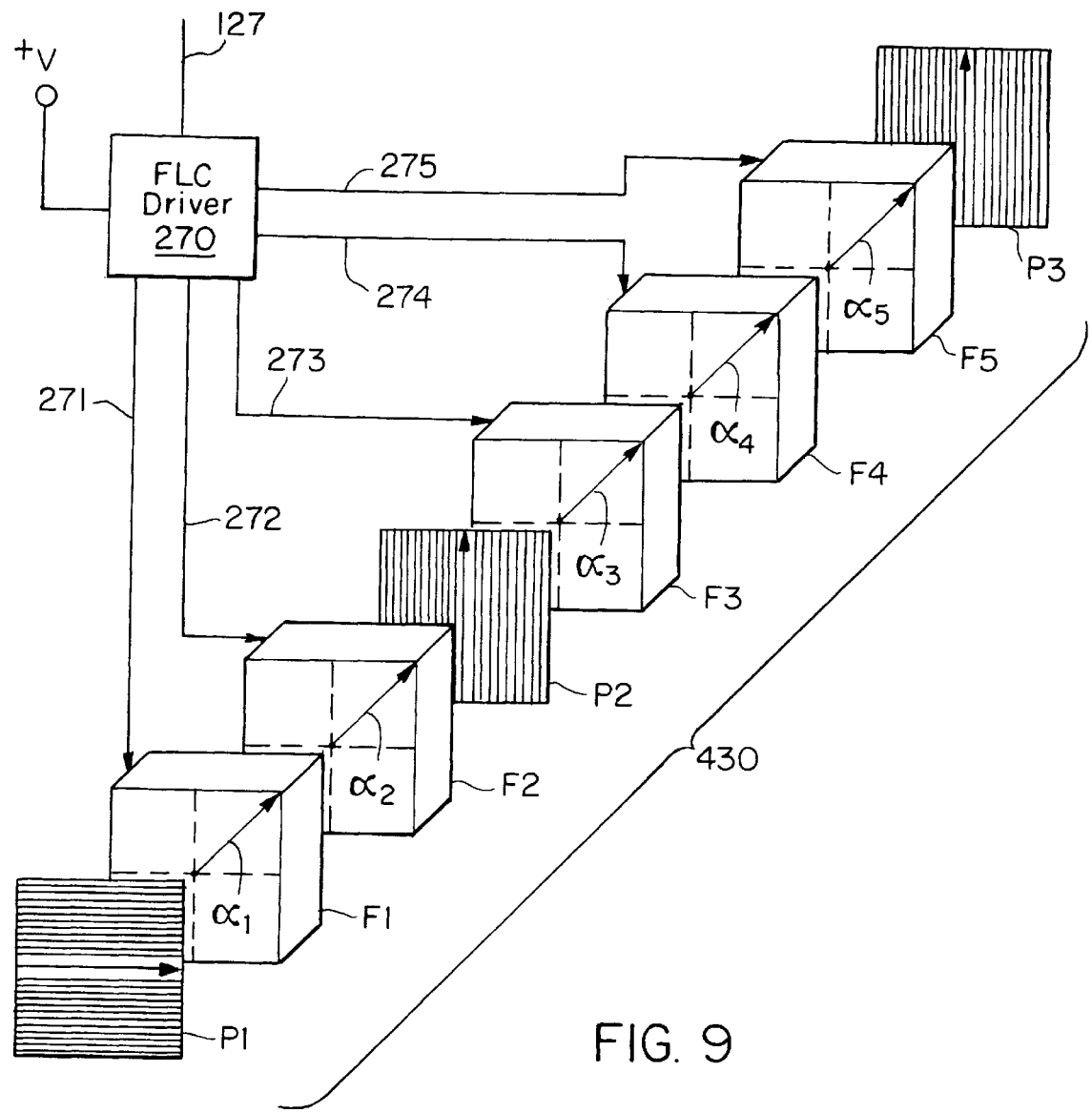
FIG. 9 is a schematic diagram illustrating a preferred embodiment of a ferroelectric liquid crystal color generator as a color filter system.

FIG. 9 is a schematic diagram of a ferroelectric liquid crystal (FLC) color generator as a color filter system 430 according to a preferred embodiment of the invention. Illustrated is a two-stage multiple wavelength blocking filter, incorporating fast switching ferroelectric liquid crystal surface stabilized SSFLC cells (F1 . . . F5). The stages are defined by polarizers P1 . . . P3 and there are two FLC cells F1,F2 in a first stage bounded by crossed polarizers P1,P2 and three FLC cells F3,F4,F5 in a second stage, bounded by parallel polarizers P2,P3. The color filter system 430 is designed to selectively transmit three visible colors (red, green and blue), and is capable of rapid color switching to generate a visual display of a continuous range of visible colors.

The two-stage blocking filter of FIG. 9 generates a transmission output centered at 465 nm (blue), 530 nm (green) and 653 nm (red). The color filter system 430 consists of three independent two-stage birefringent filter designs which are electronically selectable. For each output, the product of the transmission spectrum of each stage yields a narrow highly transmitted band centered at a chosen wavelength, here a primary color, while effectively blocking all other visible wavelengths. Preferably each stage should have a common maximum centered at a selected color (i.e., primary color). For effective out-of-band rejection, additional maxima for a particular stage must coincide with minima of another stage.

Each selected band to be transmitted (for example, each primary color band) is produced by switching at least one FLC cell in each stage. Switching more than one FLC cell in a particular stage increases retardation, thus changing the transmission spectrum. The blocking filter consists of two stages, one bounded by crossed polarizers P1,P2, the other bounded by parallel polarizers P2,P3. The polarization of each polarizer is shown by the arrows. The filter contains the five FLC cells F1 . . . F5, each with a selected thickness of liquid crystal, arranged between the polarizers. The arrows shown on each FLC cell, and the corresponding angles ($\alpha_1$–$\alpha_5$), represent the orientation of the optic axes with respect to the input polarizer. These angles can be either 0 or $\pi/4$ radians. The transmission of the filter is the product of the transmission spectra of the individual stages. A stage with multiple independently switchable FLC cells can produce multiple transmission spectra.

The first stage consists of two FLC cells F1,F2 between the crossed polarizers P1,P2. By switching the second cell F2 ($\alpha_2=\pi/4$), the output is centered in the green (530 nm) and has minima at 446 nm and 715 nm. Switching both cells F1,F2 ($\alpha_1=\alpha_2=\pi/4$) produces a spectrum that has maxima at 465 nm (blue) and 653 nm (red), with a minima at 530 nm.

The second stage consists of three cells F3,F4,F5 between the parallel polarizers P2,P3. With only the fifth cell F5 switched, the output has a maximum at 442 nm (blue) and a minimum at 700 nm. Switching all three cells F3,F4,F5 produces an output having a narrow band centered at 530 nm. The function of the second stage is to narrow the green output (obtained with cell F1 switched), and to select between the blue or red outputs produced when the first stage FLC cells F1,F2 are both switched. Switching the fifth cell F5 blocks the red output of the first stage while transmitting blue output. Switching both the fourth and fifth cells F4,F5 strongly transmits the red at 610 nm, while blocking blue output at 470 nm. Switching all three cells F3,F4,F5 of the second stage narrows the green output (530 nm) from the first stage.

The source spectrum (i.e., white light) can be transmitted by the filter by switching the first FLC cell F1 only. The first cell F1 is a zero order half-waveplate over most of the visible. Therefore, when the first cell F1 is switched, the input polarization is rotated by $\pi/2$ to align with the optic axis of the second cell F2 and the exit polarizer P2. Because the second stage is between parallel polarizers, none of those cells F3,F4,F5 need be switched. A summary of switching requirements necessary to obtain all outputs is provided below in Table 1.

TABLE 1

Summary of Switching Requirements for the FLC Blocking Filter of FIG. 7.

| OUTPUT | $\alpha_1$ | $\alpha_2$ | $\alpha_3$ | $\alpha_4$ | $\alpha_5$ |
|---|---|---|---|---|---|
| WHITE | $\pi/4$ | 0 | 0 | 0 | 0 |
| BLUE | $\pi/4$ | $\pi/4$ | 0 | 0 | $\pi/4$ |
| GREEN | 0 | $\pi/4$ | $\pi/4$ | $\pi/4$ | $\pi/4$ |
| RED | $\pi/4$ | $\pi/4$ | 0 | $\pi/4$ | $\pi/4$ |
| BLACK | 0 | 0 | — | — | — |

The thicknesses of the FLC cells F1 . . . F5 are; 1.8 $\mu$m, 5.2 $\mu$m, 2.6 $\mu$m, 1.7 $\mu$m, and 6.1 $\mu$m, respectively. The cell substrates are two $\lambda/10$ optical flats, each having one side coated with an ITO transparent electrode. The alignments layer is preferably an oblique vacuum deposited layer of SiO. Typically, the transmission of a single cell without an antireflective (AR) coating is 90%. By using HN42HE dichroic polarizers P1 . . . P3, cementing the cells in each stage together with index matching epoxy and AR coating exterior surfaces, the filter can transmit 50% of incident polarized light.

The blocking filters have been described specifically for use with an apparently white light source. They have been designed particularly to produce selected wavelength transmission in the visible spectrum. A more detailed description of tunable filters employing FLC cells is provided by Johnson et al. in U.S. Pat. No. 5,132,826, entitled "Ferroelectric Liquid Crystal Tunable Filters and Color Generators," the teachings of which are incorporated herein by reference. It will be clear to those of ordinary skill in the art that sources other than white light can be employed with FLC blocking filters. The modifications in FLC thickness, choice of materials, source light, etc. required to employ FLC filters for different light sources and in different wavelength region can be readily made by those of ordinary skill in the art.

In blocking filters, the thickness of the FLC cells and the relative orientations of the polarizer elements are selected to optimize transmission of desired wavelengths in the blocking filter and minimize transmission of undesired wavelengths. FLC cells with the required thickness and optical transmission properties for a particular color generation application can be readily fabricated using techniques known in the art. The color blocking filters, like those of FIG. 9 can be readily adapted for temporal color mixing such as for Lyot-type filters. Application of an appropriate voltage duty cycle scheme to switch the desired pairs of FLC cells can generate a range of perceived colors (color space).

In addition, a blocking filter can be designed to transmit the source light (most often white) with no wavelength effect in one switched configuration state, and transmit no light in another switched state (black). FLC pulsing schemes of such a filter can include switching to white and black to allow more flexible selection of generated colors. Blocking filters switching between two selected wavelengths or more than three selected wavelengths can be implemented by appropriate selection of FLC cells (thickness) and positioning and orientation of polarizers. Additional spectral purity of transmitted color (i.e., narrower band width) can be achieved while retaining blocking of unwanted colors by increasing the number of stages in the filter with appropriately selected FLC cells in the stages.

In a preferred embodiment of the invention, chiral smectic liquid crystal (CSLC) cells are used as the FLC cells F1 . . . F5. Color generators using CSLC cells are available from The University of Colorado Foundation, Inc. as described by Johnson et al. in U.S. Pat. No. 5,243,455 entitled "Chiral Smectic Liquid Crystal Polarization Interference Filters," the teachings of which are incorporated herein by reference. A unique characteristic of CSLC cells is their fast switching speeds (order of 10's to 100's of $\mu$sec). Filters of the present invention are capable of greater than 10 kHz tuning rates, for example between two or more discrete wavelengths. In situations where relatively slow response detectors are used, such as with photographic or movie film, or the human eye, pseudo colors can be generated using the rapidly switching filters described herein. Rapid switching between two primary color stimuli can be used to generate other colors, as perceived by the slow detector, which are mixtures of the primary colors. For example, the two monochromatic stimuli, 540 nm (green) and 630 nm (red) can be mixed in various portions to create the perception of orange (600 nm) and yellow (570 nm).

Optically, this mixing can be done by varying the quantity of power of the primary stimuli in a transmission. The same result can be achieved by switching between the two stimuli (spatially superimposed or closely adjacent) at rates faster than the response time of the eye (or any detector which averages over many periods). Color can be generated in this way using the filters described herein by varying the time for which the filter is tuned to any particular primary stimulus compared to another primary stimuli. By changing the percentage of a square wave period during which the filter is tuned to one of the primary stimuli with respect to another (i.e., varying the duty cycle of an applied voltage, for example), there is a perceived generation of colors which are mixtures of the primary inputs. In effect, the quantity of optical power transmitted in each primary stimulus is varied by changing the ratio of time which the filter is tuned to each of the primary bands. Because the response time of the human eye is about 50 Hz, the eye will average optical power over many cycles of filter switching, and many colors can be generated for visual detection.

Figure 10:
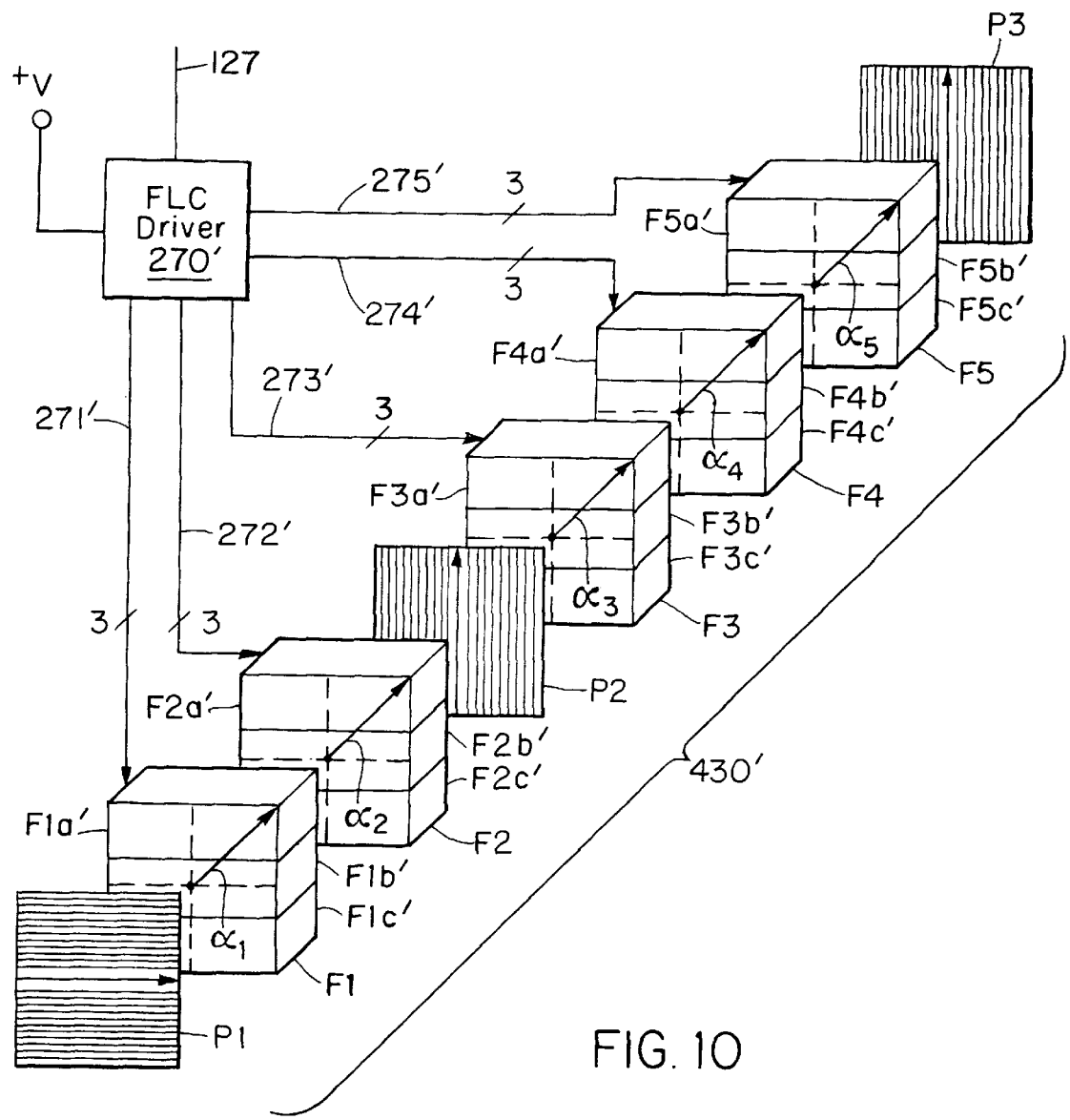
FIG. 10 is a schematic block diagram of a digital falling raster system.

FIG. 10 is a schematic block diagram of a digital falling raster system. The digital falling raster system is similar in construction to the FLC color filter system 430 illustrated in FIG. 9. Here, the color filters F1', F2', F3', F4', F5' of the color filter system 430' are each equally divided into three horizontal sections F1$a$', F1$b$', F1$c$', . . . , F5$a$', F5$b$', F5$c$'. Each section F1$a$', . . . , F5$c$' is separately addressed and controlled by the FLC driver 270' so the system produces three color stripes as an output at any one time. Each color strip may be either red, green, blue or black, with black used during data writing to the LCD 90. This is accomplished by using three individual electrodes on each color filter, instead of the single electrode described above with respect to FIG. 9.

As can be seen, the number of electrodes on the FLC filters F1', . . . , F5' can be increased to increase the number of color stripes for displaying color images and thus the duty cycle of the light incident on the color filter system 430. For example, there can be one color stripe for each line of the LCD 90. This would permit more efficient color display techniques.

Figure 11:
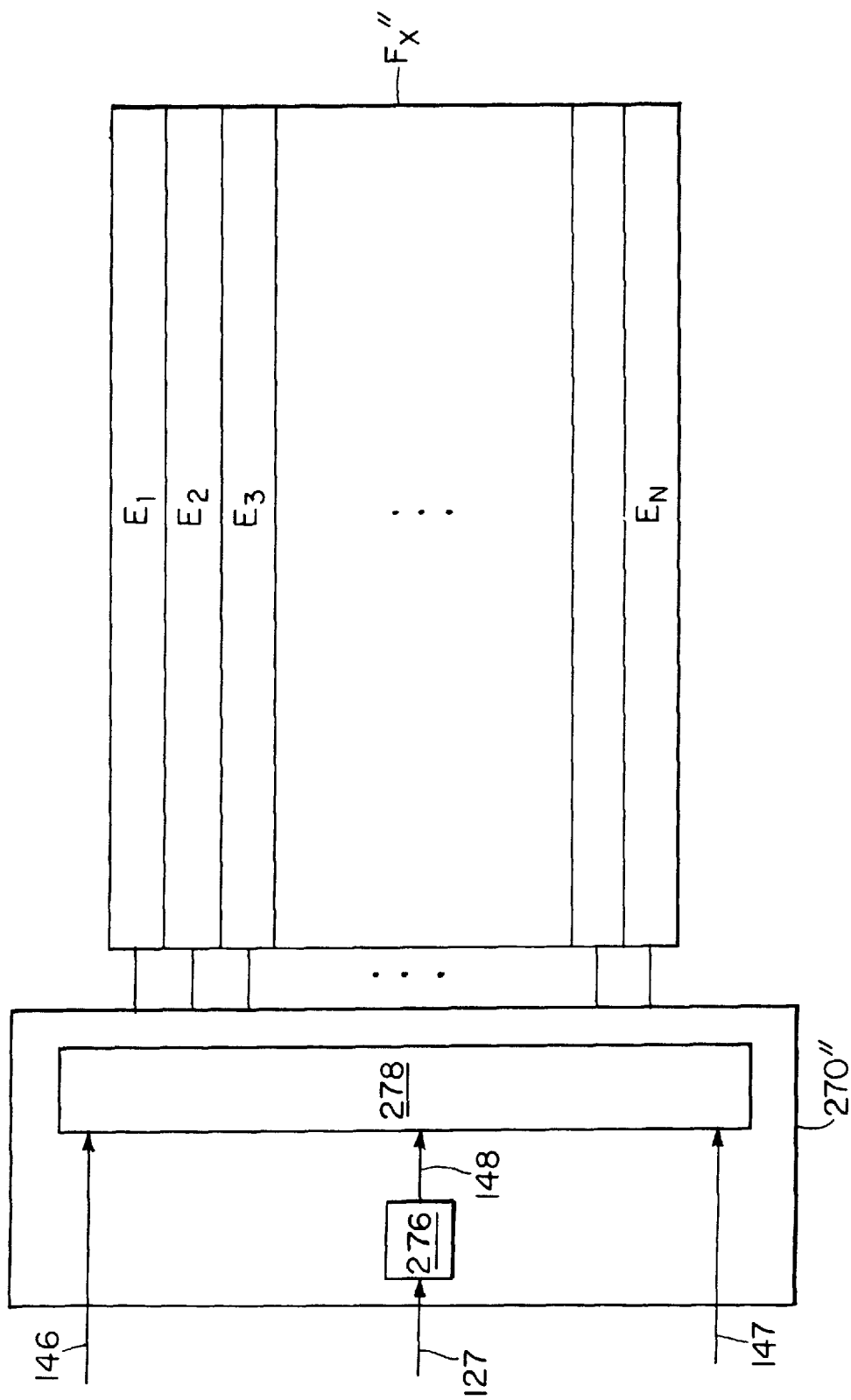
FIG. 11 is a schematic diagram of an FLC color filter having an arbitrary number of electrodes.

FIG. 11 is a schematic diagram of a preferred embodiment of an FLC color filter $F_x$" having an arbitrary number of electrodes $E_1$ . . . $E_N$. Preferably, there is one electrode E per display line of the LCD. An FLC Driver 270" is preferably fabricated with the electrodes as a single circuit module, one for each FLC filter $F_x$". The FLC Driver 270" includes a color decoder 276 and a select line scanner 278. The FLC Driver 270" receives a row address from the select data address bus 146, the select clock signal 147, and a color select signal 127 from control circuitry (not shown).

The decoder 276 of each FLC Drive 270" is tailored to the specific FLC color filter $F_x$" in the resulting color filter system. Consequently, the decoder 276 will either enable operation of the select scanner 278 for a particular color or inhibit such operation, according to the above table in response to the color selection signal 127. The enablement signal is provided to the select scanner over enable line 148.

The select scanner 278 receives the select line address 279 and, if enabled by the decoder 276, energizes the selected electrode E. If the decoder 276 has not enabled the select scanner 278, then no action is taken by the select scanner 278 for the addressed row.

As another alternative, each display pixel or block of display pixels (i.e., superpixel) on the LCD 90 can correspond to an individual color filter by forming an active matrix on the color filter system 430, which are registered to the pixel electrodes on the LCD 90. This embodiment permits random color access for each pixel on the display 90. Such a random color access in combination with random access select and data scanners of the display panel 90 permits full color burst mode refresh of the displayed image.

Returning to FIG. 8, if the lamp 410 is a flashing light source, then a lamp controller 415 (shown in phantom) is used to control the flashing of the lamp 410 via a flash synchronization line 417. The lamp controller 415 is under the control of the drive circuit 407.

FIG. 12A is a schematic timing diagram for a flash color shutter system. Illustrated is one frame of standard parallel RGB video. Typically, there are 60 frames of RGB video per second. For each color to be displayed, the drive circuit 407 writes data to the LCD 90 over the data bus 495. The drive circuit 407, while writing the color data, switches the color filter system 430 to the color corresponding to the color being written to the LCD 90. After the color data in the video frame has been written, the drive controller 407 signals the lamp controller 415 to flash the lamp 410. The steps repeat with the next color. Typically, the color filter system 430 is switched and the lamp 410 flashes at 180 Hz (i.e., three times per video frame, once for each color).

FIG. 12B is a timing diagram of a continuous light color shutter system. Illustrated is one frame of standard parallel RGB video. The drive circuit 407 of data switches the color filter system 430 to black and color data is written to the LCD 90. After a complete video frame of data has been written to the LCD 90, the drive circuit 407 signals over signal line 435 to the color filter system 430 to switch to the color filter corresponding to the color data written to the LCD 90.

Figure 13:
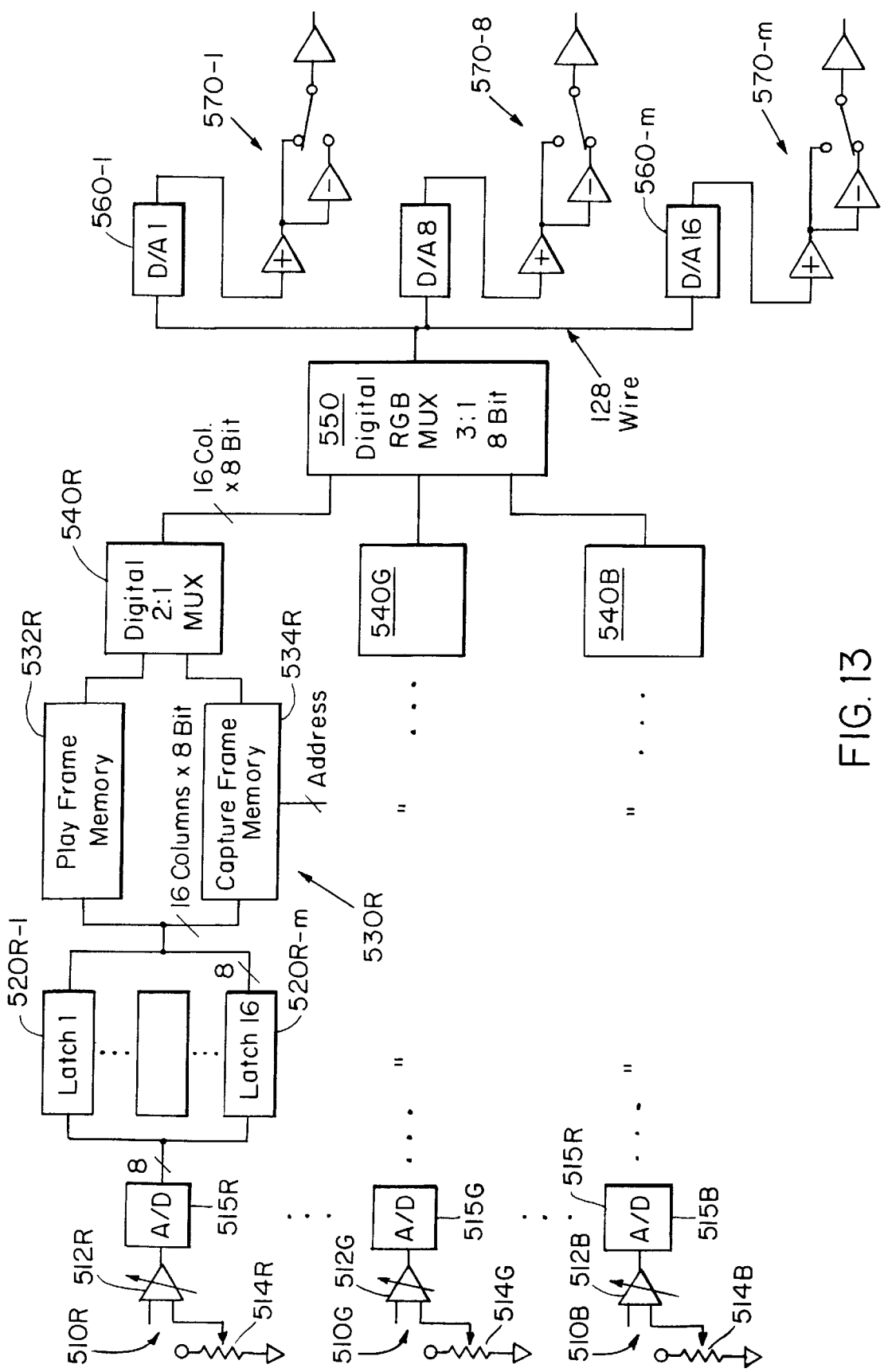
FIG. 13 is a schematic block diagram of a digital drive circuit having wide low-speed RAM.

FIG. 13 is a schematic block diagram of a digital drive circuit 407 having a wide bit width low-speed RAM. An analog digital signal is separated into red, green and blue channels. For the red channel, the analog signal is adjusted by an input circuit 510R, which includes a variable gain amplifier 512R to adjust contrast and a potentiometer 514R to adjust brightness of the video signal. The output from the input circuit 510R is converted to an 8-bit digital signal by an analog-to-digital (A/D) converter 515R. The A/D converter 515R preferably operates at about 108 MHz for a 1280H×1024V display.

A series of parallel latches 520R separates the input digital into m channels 520R-1, . . . , 520R-m. As illustrated, there are m=16 channels and therefore there are 16 latches. Each latch represents one column of the display. The latched outputs are fed to a frame memory 530R, where the digital read data is stored in either a play frame memory 532R or a capture frame memory 534R in a 16 column by 8-bit format. Preferably, the latches 520 and the frame memory 530 operate at about 6.75 MHz for a 1280H×1024V display. Such components are readily available. The total frame memory 530 required is about 7.8 Mbytes for this particular embodiment.

The appropriate frame memory 530R is selected by a digital 2:1 multiplexer 540R and the 16 column by 8-bit data stream is fed to a digital RGB multiplexer 550. The green and blue channels are identical to the above described red channel. The digital 2:1 multiplexer preferably operates at about 21.25 MHz for a 1280H×1024V display.

The digital RGB multiplexer 550 is a 3:1 8-bit multiplexer for time multiplexing the red, green and blue video data. The output from the digital RGB multiplexer 550 is fed over a 128-bit video bus to m DACs 560-1, . . . , 560-m. Each DAC 560 represents an input channel to the active matrix drive circuitry. An output network 570 is disposed between each DAC 560 for providing amplified analog signals to the drive circuitry. The output network 570 can invert the analog signal to implement column or frame inversions on alternate video frames. As illustrated, the even columns are driven by the positive gain amplifiers and the odd columns are driven by the negative gain amplifiers. This reverses on each successive video frame.

Figure 14:
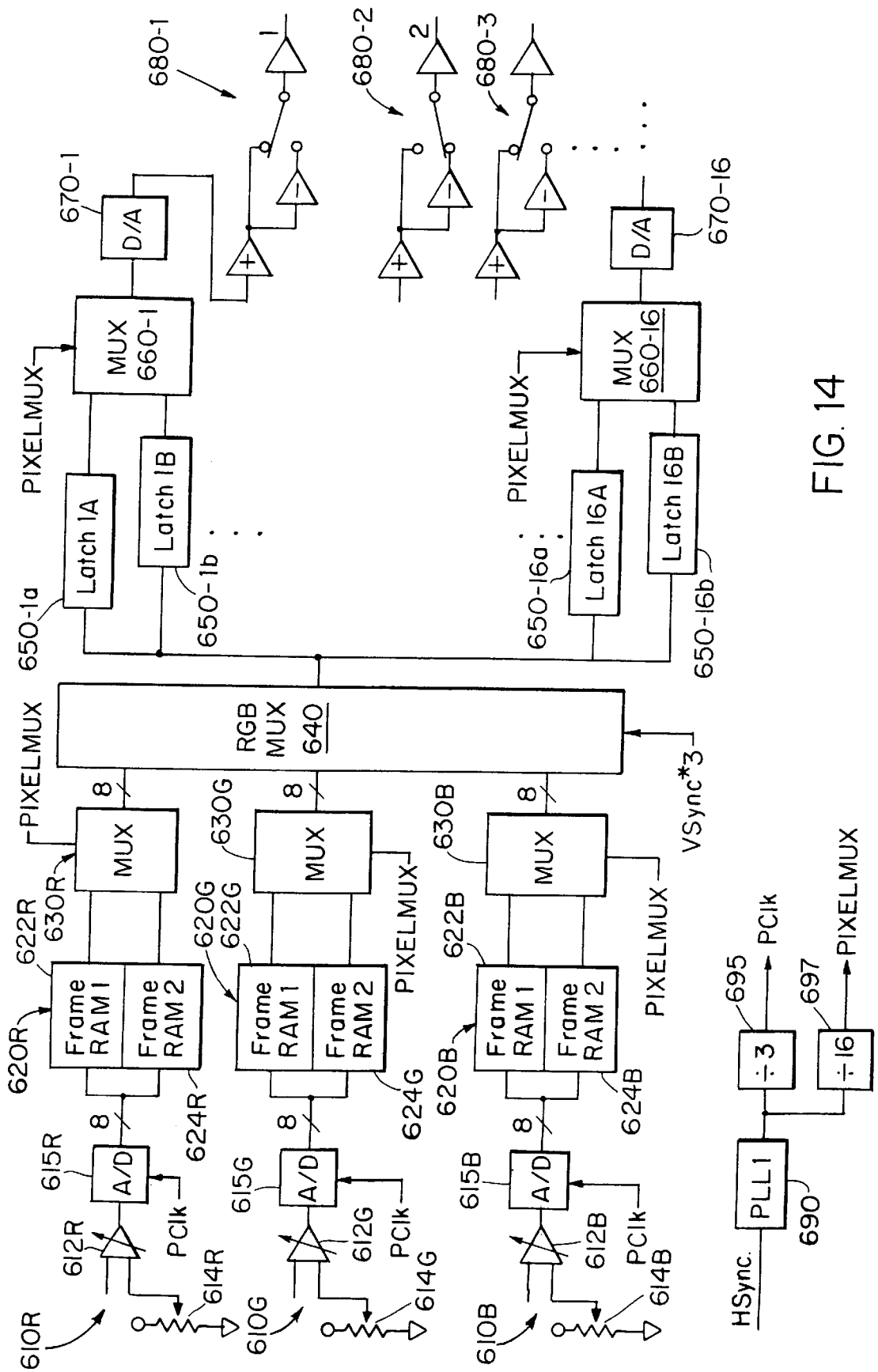
FIG. 14 is a schematic block diagram of a digital drive circuit having narrow high-speed RAM.

FIG. 14 is a schematic block diagram of a digital drive circuit 407 having a narrow bit width high-speed RAM. The RGB analog signals are separated into separate channels and input to respective input circuits 610R, 610G, 610B, which each include a variable gain amplifier 612R, 612G, 612B to adjust contrast and a potentiometer 614R, 614G, 614B to adjust brightness of the input video signal. The output from the input circuits are fed to respective A/D converters 615R, 615G, 615B to produce respective 8-bit digital color data. As above, the A/D converters 615 operate at about 108 MHz for a 1280H×1024V display.

The 8-bit color data is stored in respective RAM 620R, 620G, 620B. The RAM is divided into two video frames 622, 624, one for capture and one for playback. Capture is at 108 MHz (60 frames/sec) while playback is at 324 MHz (180 frames/sec). At present, special multiplexed memory must be used to operate at such high rates. For a 1280H×1024V display, 7.8 Mbytes of RAM is required.

The selection of the video frame is selected by a 2:1 multiplexer 630R, 630G, 630B under the control of a capture/play signal. The multiplexers 630R, 630G, 630B input 8-bit color data into an RGB multiplexer 640.

The RGB multiplexer 640 is operated under control of a timing signal generated at three times the vertical synchronization signal (VSync). A phase lock loop (PLL) 690 generates pixel clocks (PClk) coherent with the horizontal synchronization signal (HSync) at three times the original input rate. The output from the PLL 690 is processed by a divide-by-three circuit 695 to generate color data timing signals (PClk) for controlling the sampling at the original input rate and a divide-by-sixteen circuit 697 to generate pixel multiplex (i.e., capture/playback) signals (PIXELMUX) for controlling the latch outputs for playback of the video signal.

The RGB multiplexer 640 separates the 24-bit color data into 16 video input channels to the LCD 90. Each channel includes a pair of latches 650. A multiplexer 660 selects output from one of the latches 650 and feeds that output to a DAC 670. For a 1280H×1024V display, the latches operate at about 21.25 MHz. An output network 680 amplifies the analog voltage for use by the active matrix drive circuitry and provides column inversion.

Figure 15A:
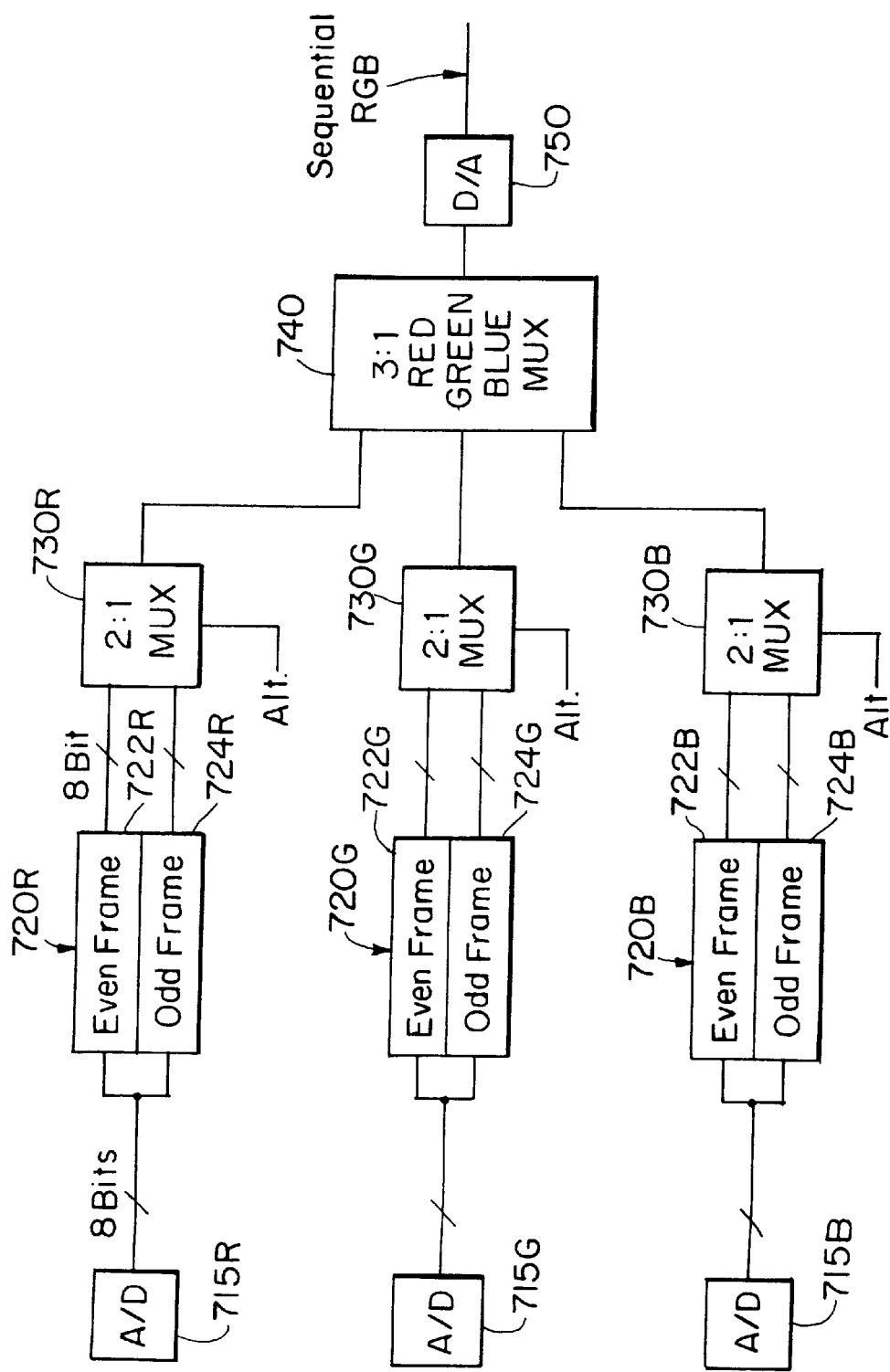
FIGS. 15A–15B are schematic block diagrams of an analog drive circuit.
Figure 15B:
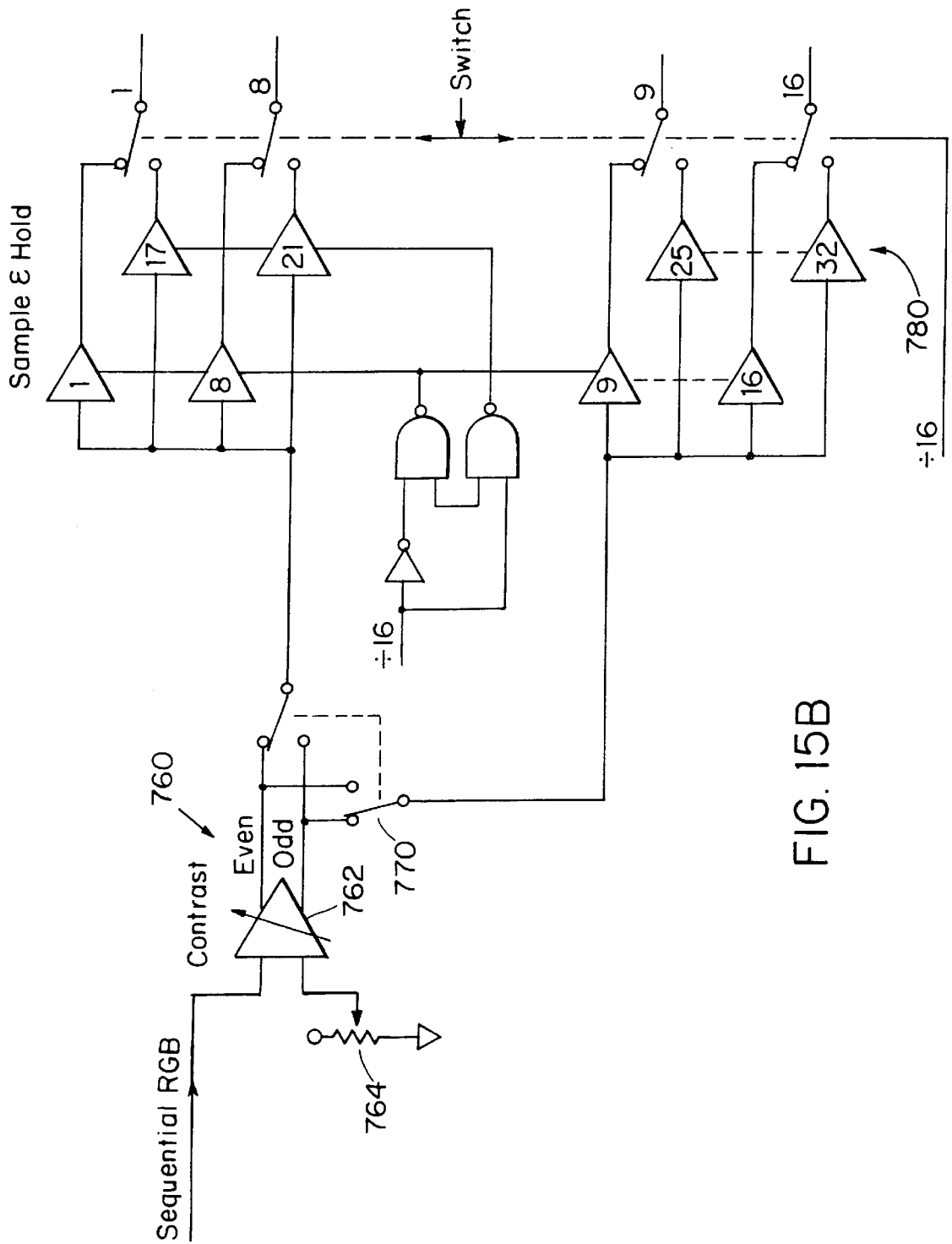

FIGS. 15A–15B are schematic block diagrams of an analog drive circuit 407. FIG. 15A is an analog front end circuit. The red, green and blue analog signal are each processed by a respective A/D converter 715R, 715G, 715B to produce an 8-bit digital, data signal. The 8-bit color data is received by a frame memory 720R, 720G, 720B. Each frame memory is divided into even and odd frames 722, 724. For a 1280H×1024V display, the frame memory 720 operates at about 108 MHz.

A 2:1 multiplexer 730R, 730G, 730B operates under control of an alternate frame signal to select one of either the even or odd frame. The 8-bit output from the multiplexers 730R, 730G, 730B are received by a 3:1 RGB multiplexer 740. The three colors are time sequenced by the RGB multiplexer 740 to yield a 24-bit digital signal. A DAC 750 converts the 24-bit digital signal to a sequential RGB analog video signal. For a 1280H×1024V display, the sequential RCE signal is operating at about 324 MHz.

FIG. 15B illustrates the drive circuitry for processing the sequential RGB analog video signal from FIG. 16A. The sequential RGB video signal is received by an input circuit 760 which includes variable gain amplifier 762 to adjust contrast and a potentiometer 764 to adjust brightness. The input circuit 760 provides both even and odd video signals. A switch 770 selects between the even and odd video signals to provide for column inversion. An output network 780 is also switched to provide two sets of 16 channels—one set holds signals to display while the other set sampling data for display on the next cycle. The output network 780 is preferably a sample and hold network. The sample and hold circuitry of the output network 780 may be too slow to operate for a 1280H×1024V display, but would be suitable for a 640H×480V display.

Figure 16:
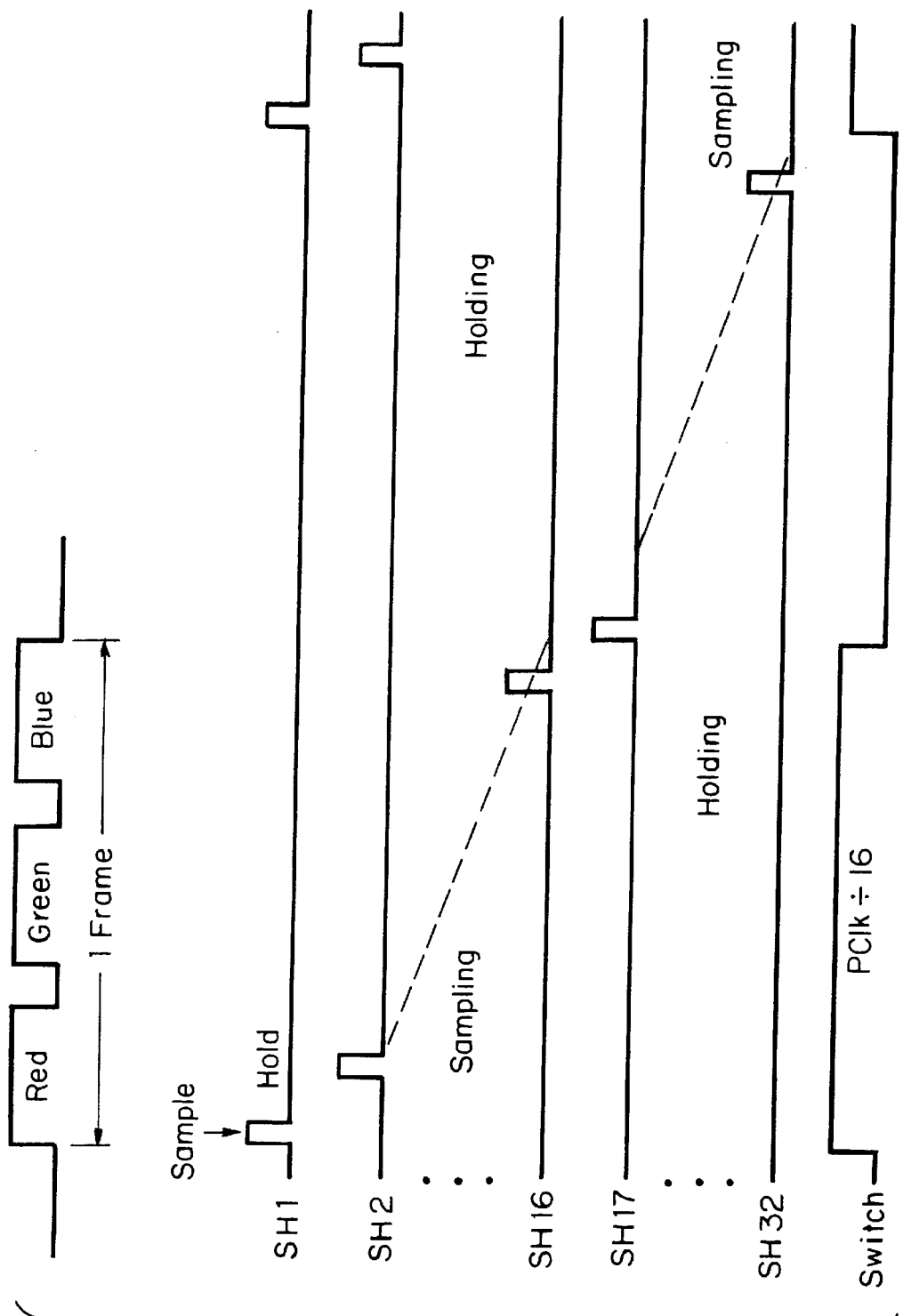
FIG. 16 is a timing diagram of the drive circuit of FIG. 15B.

FIG. 16 is a timing diagram of the drive circuit of FIG. 15B. There are 32 sample-hold amplifiers in the output network 780, two for each of the 16 output channels. The amplifiers are switched in response to a signal generated every 1/16 of the pixel clock period. While one of the amplifiers per output channel is sampling the RGB signal, the other is holding the previously sampled data for the display.

Figure 17:
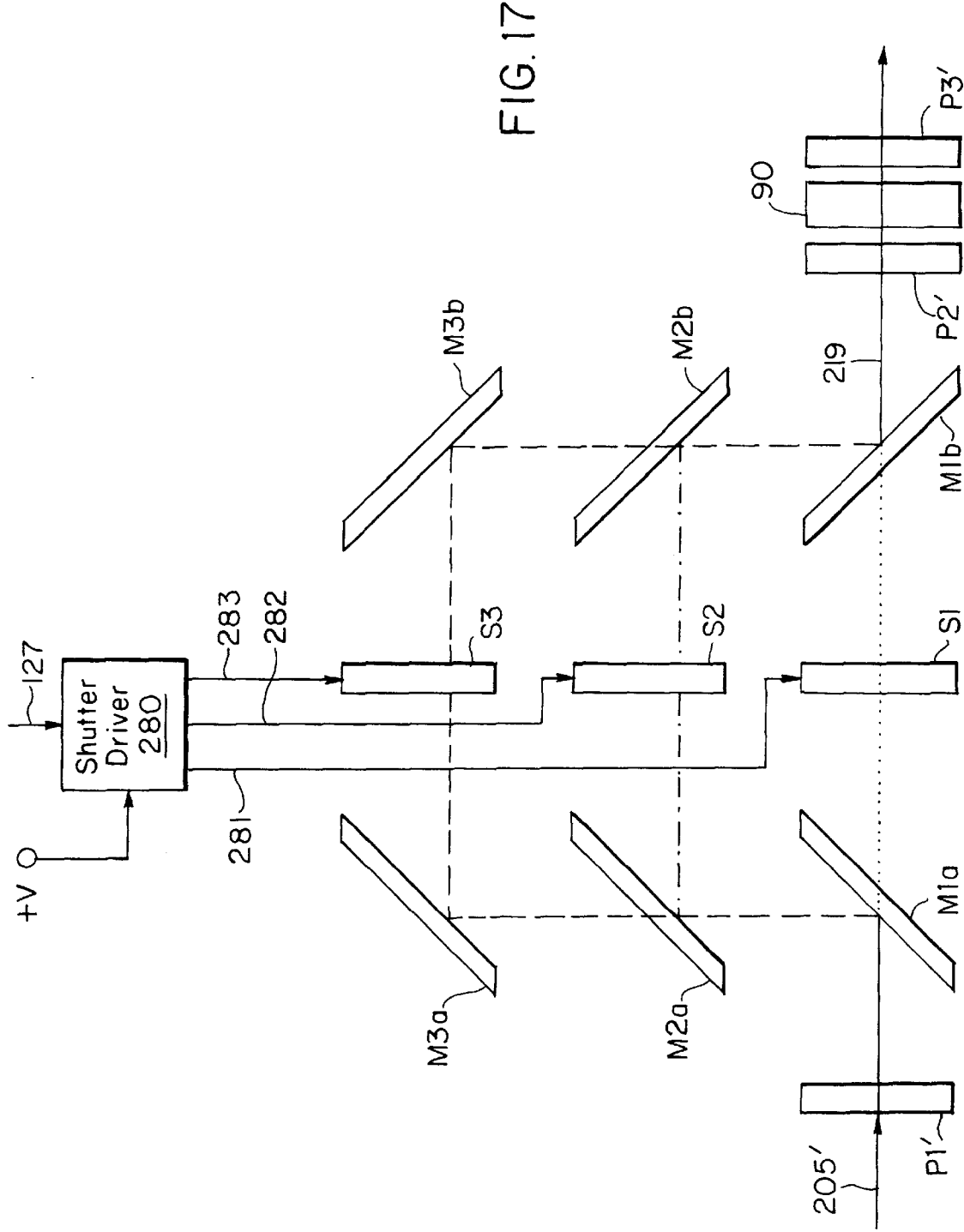
FIG. 17 is a schematic diagram of a preferred color display system utilizing electronically-controlled color shutters.

FIG. 17 is a schematic diagram illustrating a color sequential system using liquid crystal shutters. Liquid crystal cells S1, S2, S3 are used as a light switch instead of mechanical switches or other types of switches. A beam of white light 205' passes through a first polarizer P1' and is divided into blue, green and red components by respective mirrors M1a, M2a, M3a. The first mirror M1a passes blue light to the blue shutter S1 and reflects red and green light to a second mirror M2a. The second mirror M2a receives the red and green light reflected from the first mirror M1a and reflects the green light to the green shutter S2 and passes the red light to the third input mirror M3a. The third mirror M3a reflects the red light toward the red shutter S3. The shutters S1, S2, S3 are controller by a shutter drive 280 through respective control lines 281, 282, 283. The shutter drive 280 is tied to the color select signal 127 from the video signal generator 12 of FIG. 2. The shutter driver decodes the color select signal and actuates the appropriate shutter S1, S2, S3 to pass the corresponding colored light.

If the blue shutter S1 is actuated, the blue light is passed through the first exit mirror M1b. If the green shutter S2 is actuated, the green light is reflected by the second exit mirror M2b and the first exit mirror M1b. If the red shutter S3 is actuated, the red light is reflected by the third exit mirror M3b, passed through the second exit mirror M2b and reflected by the first exit mirror M1b. The selected exit light 219 is then passed through the active matrix region 90 as previously described herein disposed between parallel polarizers P2',P3'. The active matrix display 90 is controlled in conjunction with driver 280 to provide color sequential imaging.

Figure 18B:
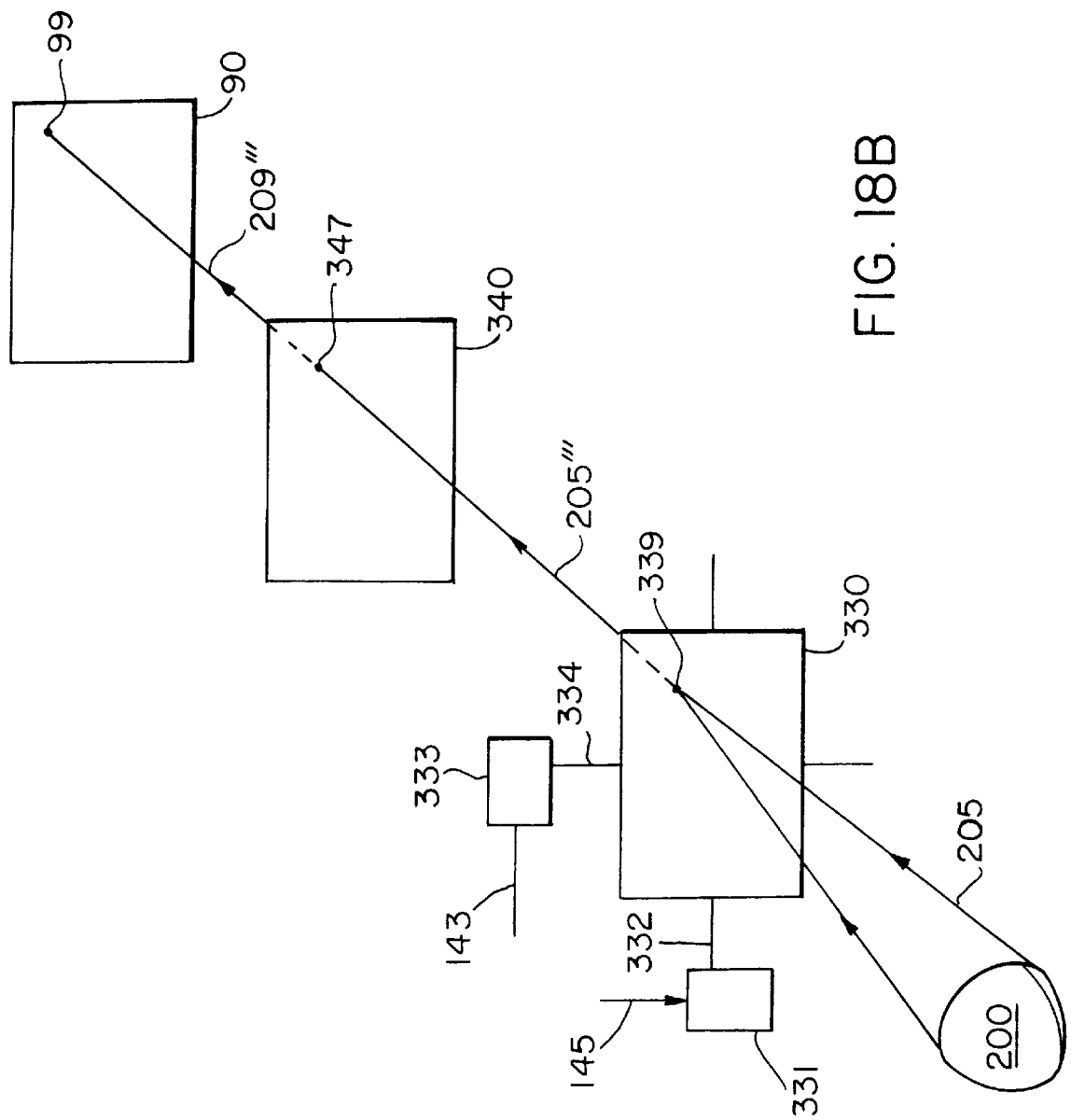

FIGS. 18A–18B are schematic diagrams illustrating another preferred embodiment of the invention employing a rotating prism. In FIG. 18A, a light source 200' generates a strip beam of white light 205', which is focused as a linear horizontal stripe 335 on a deflector 330. The deflector 330 can be tilted relative to the vertical plane by a translator 331. The translator 331 is coupled to the deflector 330 via an axle 332. The translator operates under the control of the drive signal 145 from the video controller signal generator 12 of FIG. 2. As the deflector 330 is rotated, a deflected strip of white light 205'' is directed toward a color shutter 340. The optics are aligned such that a strip of light 345 is incident horizontally across the color shutter 340.

The resulting strip of colored light 209'' is focused as a color strip 95 on the active matrix region 90. Rotation of the deflector 330 thus results in a color light beam 95 scanning down the active matrix region 90. In the preferred embodiment of the invention, the strip of colored light 95 incident on the active matrix region 90 is registered to a line of pixel electrodes registered to the operation of the translator 331.

Although the translator 331 is shown as a mechanical device, an electronically actuated beam deflector 330 could be substituted. In another preferred embodiment of the invention, the lit pixel row 95 can be randomly selected by operation of the deflector 330.

FIG. 18B is a schematic diagram that illustrates the use of a scanning dot or point to illuminate the active matrix region 90. The system of FIG. 18B differs from that of FIG. 18A in that a light source 200 generates a converging beam of light 205, which is focused to be incident at a point 339 on a deflector 330. The deflected white light 205''' is deflected to be incident on the color shutter 340 also at a point 349. The colored beam of light 209''' then becomes incident at a pixel location 99 of the active matrix region 90. The deflector 330 is controlled through a rotatable member 332 by a vertical translator 331 as in FIG. 10A and through a rotatable member 334 by a horizontal translator 333. The vertical translator 331 is controlled by the control signal generator 12 of FIG. 2 by the row address signal 125. The horizontal translator 333 is controlled by the video control generator 12 of FIG. 2 via the pixel data signal 142.

The pixel 99 of the active matrix display region 90 is registered to the movement of the translators 331,333 such that the translators can position of the deflector 330 in a plurality of discrete orientations, one discrete orientation for each pixel of the active matrix region 90. As discussed with regard to FIG. 18A, the beam deflector 330 can be electronically actuated. In addition, the beam can be scanned across the active matrix region 90 in a raster scan fashion.

Figure 19:
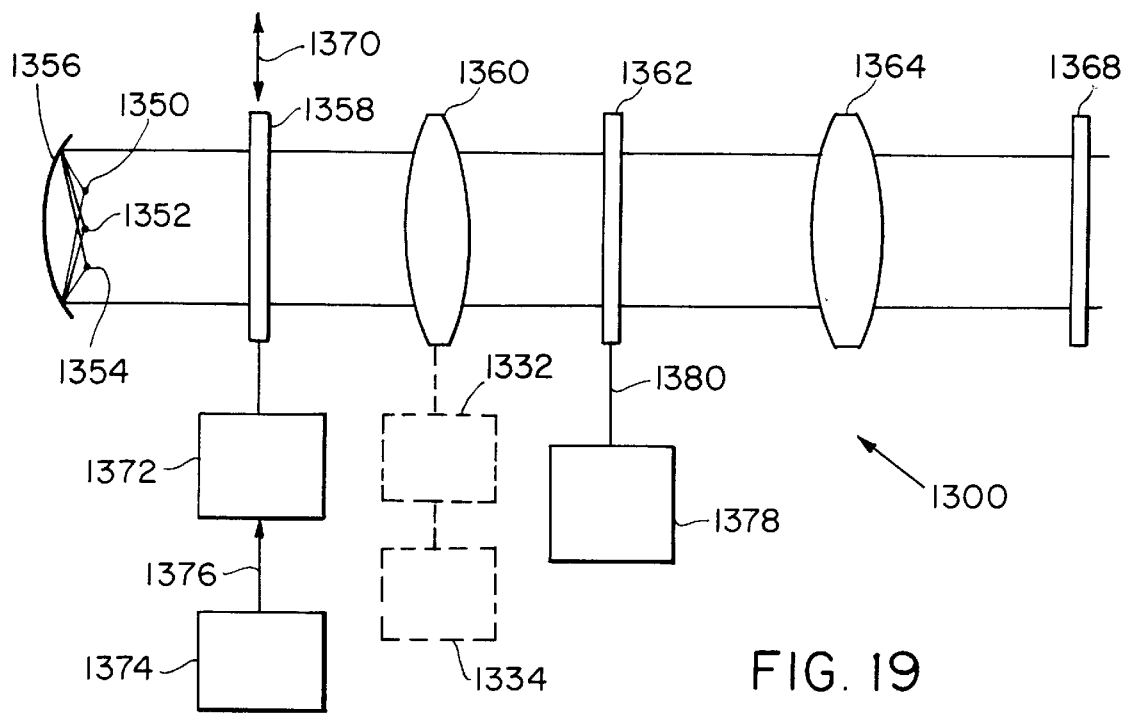
FIG. 19 is a schematic illustration of a color sequential projection system utilizing a binary optic.

FIG. 19 is a schematic illustration of one embodiment of a LCD projection system 1300 using color sequencing to produce a full-color image. The system 1300 includes three monochromatic LED point or line sources 1350, 1352, 1354, which produce red, green and blue light, respectively. A parabolic mirror 1356 behind the point or line sources 1350, 1352 and 1354 directs light from the sources through a diffractive or binary optic element 1358. The binary optic element 1358 splits the incoming light into multiple parallel horizontal bands of monochromatic light which are perpendicular to the page of the drawing. The bands of light are ordered in color along the vertical axis in a repeating pattern. For example, a red band is followed by a green band which is followed by a blue band which is followed by another red band, etc. The colored bands are projected by a field lens 1360 onto the LCD panel 1362. The colored bands from the binary optic 1358 are spaced such that alternating rows of pixels in the LCD are illuminated by a single colored band. The pixel rows between the illuminated rows remain black, i.e., unilluminated. Light passing through the LCD 1362 is projected by projection lens 1364 onto a projection screen 1368.

A full-color image from the LCD 1362 is produced by color sequencing through the pixels. To perform the color sequencing, the binary optic 1358 is movable along the vertical axis as indicated by the arrow 1370. A controllable actuator 1372 controlled by a controller 1374 is coupled to the binary optic 1358 so as to control the vertical movement of the optic 1358. In one embodiment, the actuator 1372 is a stepping actuator controlled by step pulses on control lines 1376 from the controller 1374. In an alternative embodiment, the field lens can be controllably moved along the vertical axis and/or tilted about its normal axis. The alternative actuator 1332 and its associated controller 1334 are shown in phantom in FIG. 19 coupled to the field lens 1360.

In each stationary position of the binary optic 1358, alternating rows of pixels of the LCD 1362 receive light of a single color and transmit the light according to pixel data loaded into the LCD 1362. At the same time, the unilluminated rows interposed between the illuminated rows are addressed and loaded with pixel data from a LCD controller 1378 along lines 1380. When the unilluminated rows are illuminated in a subsequent step, they transmit the light according to the loaded pixel data.

The pixel data controls whether particular pixels will pass or block the light of a particular color when they are illuminated by that color band. To control the intensity of the color, in an LCD using a ferroelectric LC, the pixel data also includes data which controls the duration of time during which the pixel will transmit light of the color. That is, pixels which require a large amount of blue in their final colors will be set for transmission durations longer than those requiring a small amount of blue. In an LCD using a twisted nematic LC, the pixel data for each pixel encodes an analog voltage level applied to the pixel to control grey scale level and, therefore, the color intensity transmitted by that pixel.

The stepping actuator 1372 is pulsed by the controller 1374 to step the binary optic element 1358 through successive stationary positions. At every other position, each row of pixels transmits light of a particular color. When the binary optic element 1358 steps through six positions, each row of pixels has received all three color bands and has therefore produced a frame of full-color data.

The binary optic element 1358 can be produced by etching desired shapes directly into the surface of an optical material, such as glass, using photolithographic and microfabrication techniques in order to produce a controlled variation in glass thickness. The binary optic element 1358 then creates the desired output light pattern by diffraction. The controlled variation in thickness of the element 1358 breaks up the wave front of incoming light at each point on the element's surface and reconstitutes it as a wave traveling in the desired direction. The phase delay introduced by the variation in element thickness causes the controlled redirection of the light emerging from the back surface of the optical element 1358. The surface of the element 1358 is therefore characterized by a custom phase profile dictated by the desired output optical pattern, which, in this embodiment, is a pattern of evenly spaced continuous parallel bands of light.

The desired phase profile can be translated into a pattern of thickness steps fabricated on the surface of the element 1358. The thickness steps dictated by the desired phase profile are formed by a series of photolithography and microfabrication process steps. For example, the element 1358 is first coated with a photoresist which is then masked, exposed and developed to produce a pattern on the element for the first layer of etching. The element 1358 is then etched by reactive ion etching or other controllable etching process to remove material as desired for the layer. The next layer of steps is produced by again coating the element with photoresist and masking, exposing and developing the photoresist. The subsequent etching step produces the second layer of steps in the phase profile. The process continues until the entire phase profile of the element 1358 is produced by the varying thickness steps in the element 1358.

The phase profile for the binary optic element 1358 can be generated using a commercially available optical design tool, such as CODE V for example, a commercially available software package manufactured and sold by Optical Research Associates of Pasadena, Calif. The user of the package provides inputs to CODE V in the form of coordinates which define the configuration of the desired optical output, e.g., the evenly spaced parallel illumination bands. From the phase profile generated by the designer using CODE V, the required thickness step profile and associated masks used to fabricate the steps on the element 1358 are generated.

In another embodiment, the process described above is used to produce a mold which can then be used to produce the binary optic element 1358 in large quantities. The above steps are performed on a mold material to form a master. The master is then used to stamp a moldable optical material such as plastic into the optical element 1358 having the desired phase profile.

FIG. 20 is a schematic elevational view of pixel rows in a LCD display 24 used to illustrate the color sequencing process of the invention. The figure illustrates a single stationary position of the colored illumination bands relative to rows 24a–24o of pixels. It therefore represents one step, for example, the first step, of the color sequencing process. In the following discussion, row 24f of pixels will be referred to by way of example. It will be understood that the description is applicable to all rows of pixels.

In the position shown, rows 24b, 24d and 24f are illuminated with red, green and blue illumination bands, respectively. The pixels in these rows transmit the color with which they are illuminated according to the pixel data previously loaded into the pixel rows. That is, row 24f transmits its blue contribution to the final full-color image. Pixel rows 24a, 24c and 24e are not illuminated ("black") since they fall between the illumination bands. These rows are presently loaded with pixel data for the next step depending upon the next color in the sequence. For example, assuming the illumination bands are to be shifted down in the next step, row 24e is presently loaded with green pixel data.

In the next step, rows 24b, 24d and 24f become black and are loaded with pixel data for the next step. For example, row 24f is loaded with green pixel data. In the following step, the green band illuminates row 24f, and the green light is transmitted according to the loaded pixel data. In the fourth step, row 24f is again black while red pixel data is loaded. The binary optic is then stepped once again to move the red illumination band onto row 24f. Red data is transmitted to complete the full-color data for the particular frame for row 24f. Finally, in the sixth step, the optic 1358 is moved down one more step such that row 24f is not illuminated. During this step, row 24f is loaded with blue pixel data for the next frame.

In a preferred embodiment, to begin the next frame, the binary optic 1358 is moved back in the reverse direction a distance of six pixel line heights such that the first step in the sequence is repeated. Rows 24a, 24c, 24e are once again black, and row 24b is illuminated with red light, row 24d is illuminated with green light and row 24f is illuminated with blue light. Hence, in this embodiment, the color sequencing process is a periodic six-step process in which six stepper pulses are applied to the stepper actuator 1372 (FIG. 1) to produce a single complete full-color frame. To ensure a full-color frame rate of 60 Hz, for example, the stepper pulse frequency is 360 Hz.

It will be seen from FIG. 2 that for a given number of pixel rows in a display, half as many illumination bands are required, one-third of which are dedicated to each single color. That is, in a display having 480 pixel rows, a total of 240 spaced illumination bands are required, 80 of each color. The binary optic element 1358 is fabricated to produce the required quantity and pattern of illuminated lines.

In another embodiment, the binary optic is configured to produce multiple rows of equal intensity colored spots instead of the multiple continuous illumination bands of the embodiment described above. In this embodiment, the binary optic produces a two-dimensional rectangular array of spots in correspondence with the two-dimensional array of pixels in the LCD. That is, each single-colored illumination band of the embodiment described above is replaced with a row of separate equal-intensity spots of the single color. The spots are evenly spaced to coincide with pixels along pixel rows in the LCD 1362. This embodiment results in less light from the sources being lost and is therefore more optically efficient. Optical efficiency is further improved by shaping the LCD pixels such that as much as possible of each spot of light impinges on LCD pixels.

The foregoing description refers to sequentially illuminating rows of pixels with horizontal bands or spots of colored light. It will be understood that the invention can also be implemented by sequentially illuminating columns of pixels with vertical bands of colored light. The binary optic element 20 can be made to produce the vertical illumination bands, and the process described above of stepping vertically through rows of pixels can be altered to step horizontally across vertical columns of pixels.

Figure 21:
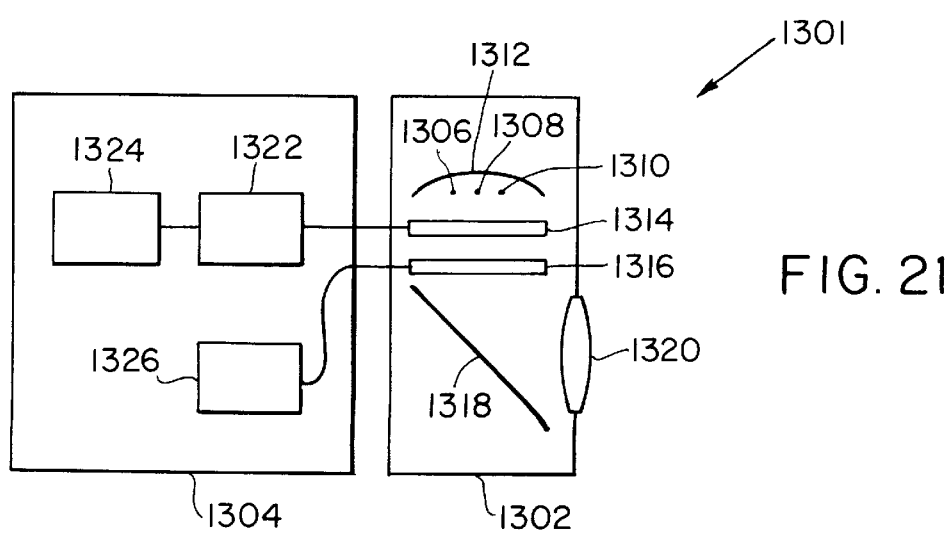
FIG. 21 is a schematic diagram of a head mounted color sequential LCD display system.

FIG. 21 is a schematic diagram of a head-mounted embodiment 1301 of the full-color display of the invention using a diffractive or binary optic element 1314 to perform the color sequencing operation. The system 1301 includes an eyepiece 1302 and a control and drive circuit module 1304 coupled together by conductive leads. The functional operation of the embodiment 1301 shown in FIG. 3 is essentially the same as that for the embodiment 1300 shown in FIG. 1, except that it is adapted to be implemented in a head-mounted environment. In the embodiment of FIG. 3, as in the previous embodiment, three individual LED sources 1306, 1308 and 1310 provide the illumination for the three separate colors red, green and blue. The parabolic mirror 1312 directs the illumination light onto the diffraction or binary optic element 1314 which produces the multiple parallel bands of monochromatic light. As in the previous embodiment, a stepper actuator 1322, operating via step pulses under the control of the stepper controller 1324, causes the binary optic element 1314 to move as described above to produce the sequential color illumination as described above. The light passes through the LCD 1316 which receives control and data from the LCD controller 1326 and then reflects from fold mirror 1318 through the eyepiece lens 1320 where the full-color image can be viewed. The stepper control circuitry and the LCD control circuitry are mounted on the frame of the head mounted system as described in greater detail below.

Color sequential systems in accordance with the invention are well suited for use in head mounted displays due to their compact and light weight structure. They provide a significant improvement over existing head-mounted systems as the resolution provided by a color sequential system is substantively higher than the resolution of color filter based liquid crystal displays presently in use. When combined with the compact structure of the transferred silicon active matrix display which provides a high resolution display having a diameter of less than 1 inch as well as integrated high speed driver circuitry described herein.

Figure 22:
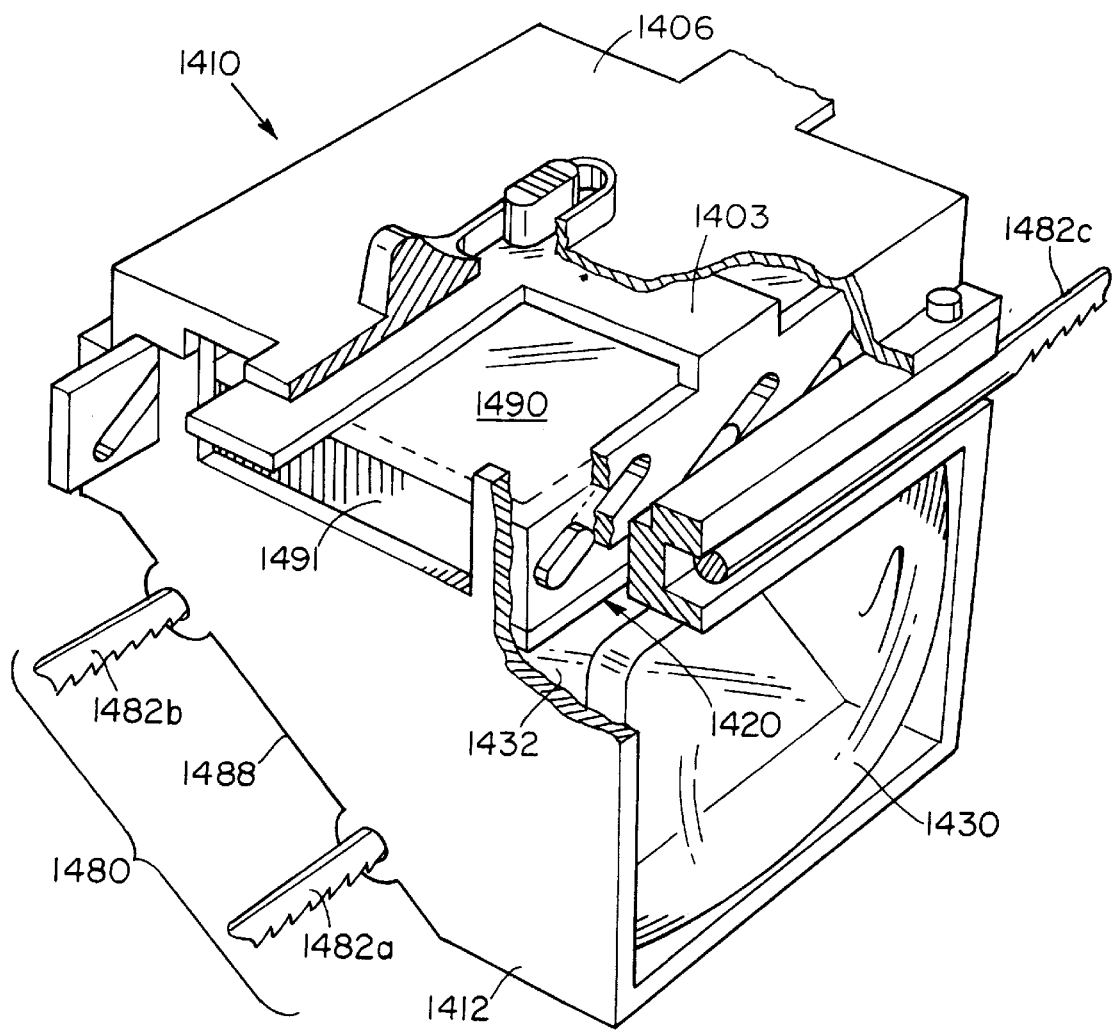
FIG. 22 is a perspective view of an optics module and partial broken view of the housing for the module in a head-mounted display system.

FIG. 22 is a perspective view of an optics module sub-assembly 1410 with portions of the housing 1412 broken away. Two of these modules 1410 are mounted to a triangulated rail system 1480 having rods 1482*a*, 1482*b*, 1482*c* and comprise an optics assembly. Each optics module 1410 consists of the following: A display 1420; a backlight and color sequential system 1490; a lens 1430; a mirror 1432; an optic housing 1412; a focus adjust slide 1403; an IPD adjust/cover 1406; and a rail slide 1488. The backlight system can be two or three LEDS, or alternatively two or three miniature fluorescent lamps to provide two or three primary colors respectively.

Figure 23:
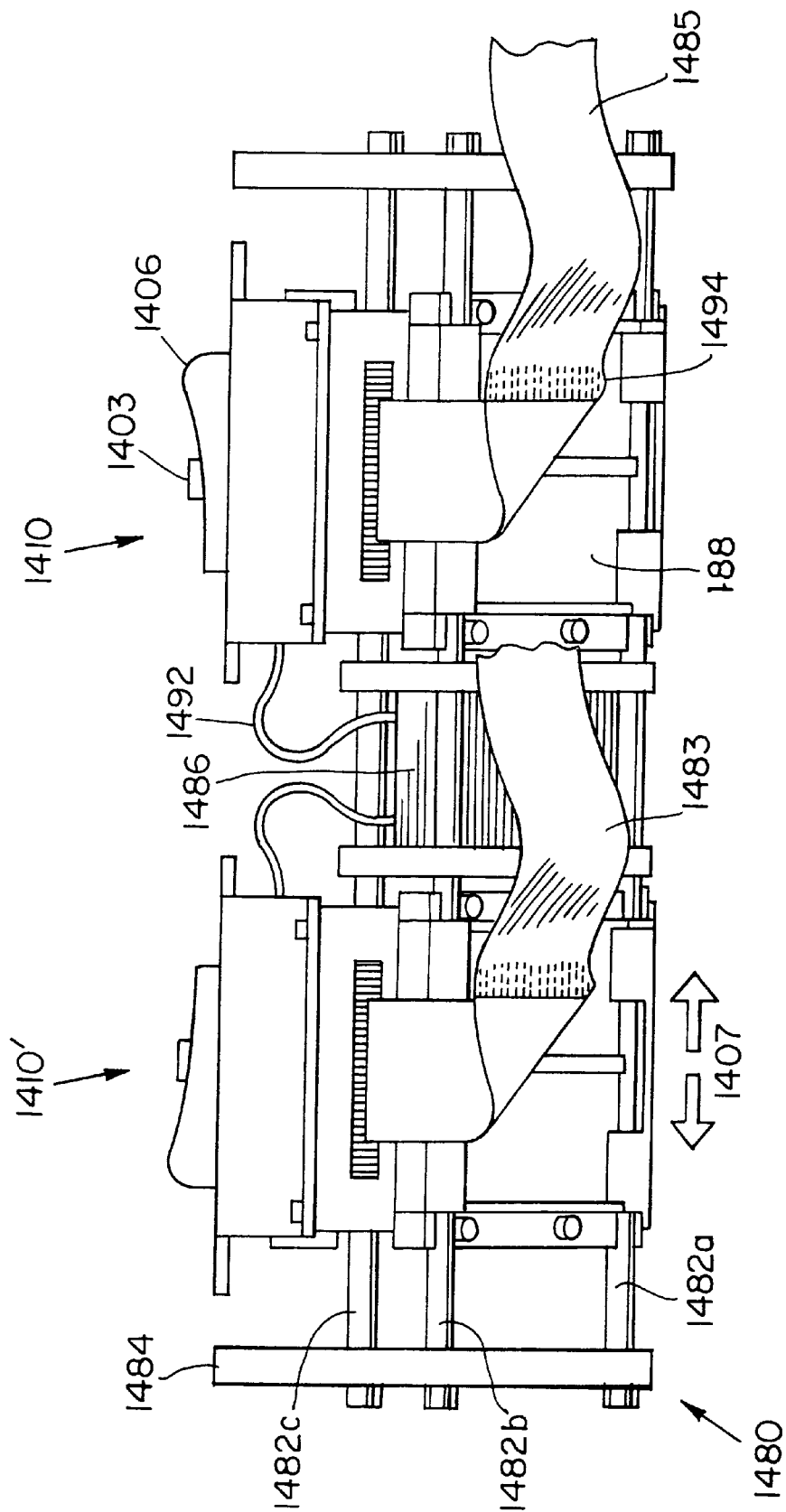
FIG. 23 is a back view of two modules for a binocular head mounted display.

FIG. 23 is a back-side view of two modules 1410, 1410' mounted on a rail system 1480. As shown the two modules 1410, 1410' are mounted on rail system 1480. In addition to the triangulated rods 1482*a*, 1482*b*, 1482*c*, the rail system 1480 includes rod and supports 1484. The rods 1482 are supported by a central triangulated support member 1486. Also illustrated are a backlight cable 1492 and a display cable 1485. Each display cable 1485 is fixed to the rail slide 1488 by an adhesive or mechanical contact 1494. The display cable 1485 includes a cable travel bend 1483, where the display cable 1485 folds and unfolds to permit adjustments to the IPD 1407.

FIG. 24 is a side cross sectional view of the optics module housing 1412 which is mounted on rails 1482*a*, 1482*b*, and 1482*c*. The optical system includes lens 1430, mirror 1432, the color sequential generator 1490 and display 1420. Generator 1490 can be any of the compact color sequential systems described herein including, for example, the embodiments of FIG. 9 or FIG. 10, or that depicted in FIG. 21 or FIG. 32. Focus can be accomplished with a sliding ramp system, shown in FIG. 25 which is incorporated into the focus adjust slide 1403 and the generator housing 1491. Tabs 1443 protruding from the generator housing are engaged in slots 1445 incorporated in the focus slide 1403. As the focus slide button 1407 is moved horizontally, the backlight housing (along with the attached display) move vertically. Multiple tabs 1443 ensure positive alignment throughout the motion range. The button 1403*a* serves as the top of the assembly capturing the top on the focus slide.

FIG. 26 shows the display placed at the focal length of the lens 1430, thus producing an image of the display at an apparent distance of infinity to the viewer. Generator and display module 1420 can include any of the compact color sequential systems described herein. The lens has a small focal length, preferable about 1 inch and can be moved as indicted at 1437 to provide a manual focus adjust. The flat optical element is present to correct for lateral color separation in the lens. This element consists of a diffractive optic 1434 designed to compensate for the lateral color. The mirror serves to fold the optical path to minimize the depth of the head mounted device while extending its height. The mirror is optional to the system and is present for desired form factor. Two such modules make up a binocular head mounted display system: one for each eye. The distance that the displays appear to the viewer can be adjusted for personal comfort, generally between 15 feet and infinity. The lens 1430 can slide forward and backward 1437 using frame assembly 1435. The magnification of the system is about 10.

Other lens systems can be used and are available from Kaiser Electro-Optics, Inc. of Carlsbad, Calif. Such a system is described in U.S. Pat. No. 4,859,031 (issued Aug. 22, 1989), the teachings of which are incorporated herein by reference. Such a system 1500 is shown in FIG. 27. The display system 1500 includes an active matrix display 1502, a polarizing filter 1504, a semi-reflective concave mirror 1506, and a cholesteric liquid crystal element 1508. The image that is generated by the display 1502 is transmitted through the filter 1504, the semi-reflective concave mirror 1506, to the element 1508. The element 1508 reflects the image back onto mirror 1506 which rotates the light so that, upon reflection back to element 1508, it is transmitted through element 1508 to the viewer's eye 1509. A lens can be used with this system depending upon the size, resolution, and distance to the viewer's eye of the optical system components and the particular application. A color sequential generator 1505 can include the backlight system and any of the compact color sequential systems described herein.

Figure 28:
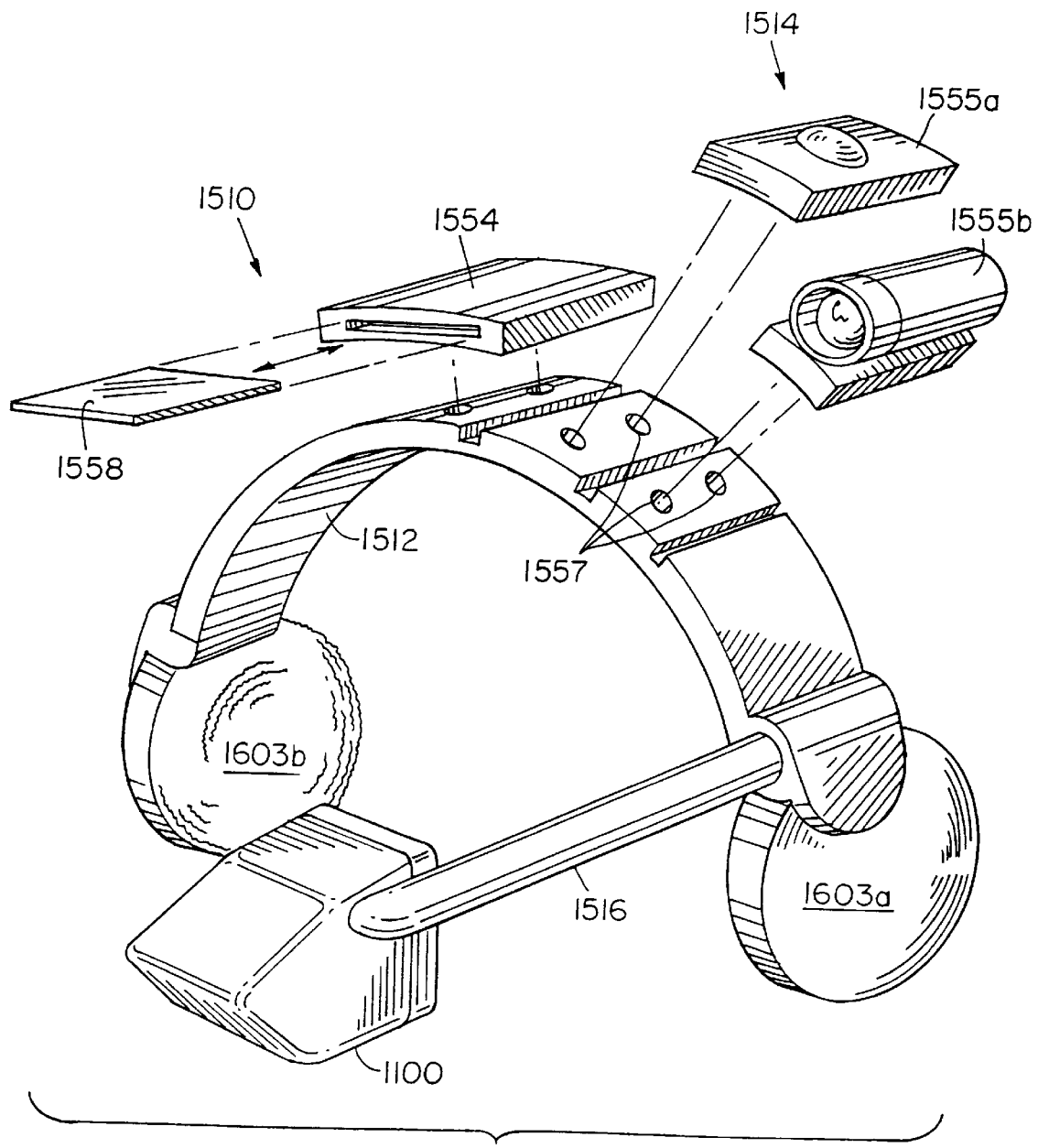
FIG. 28 is a perspective view of a monocular head mounted color sequential LCD system.

FIG. 28 is a perspective view of a preferred head-mounted computer 1510. As illustrated, there is a head band 1512, stereo headphones 1603*a*, 1603*b*, a display arm 1516 connecting the headband 1512 to a display pod 1100, which includes a display panel and color sequential generator as described herein. The CPU and video drive circuitry are fabricated as an integral part of the head band 1512. Shown on the head band 1512 are plurality of ports 1557 which accept expansion modules. As shown, there is a Personal Computer Memory Card International Association (PCMCIA) interface module 1554 coupled to the head band 1512. A PCMIA card 1558 is inserted into the PCMCIA interface module 1554. Also illustrated are expansion modules 1514, such as an infrared communication sensor 1555*a* and a Charge Coupled Device (CCD) camera 1555*b*.

Figure 29A:
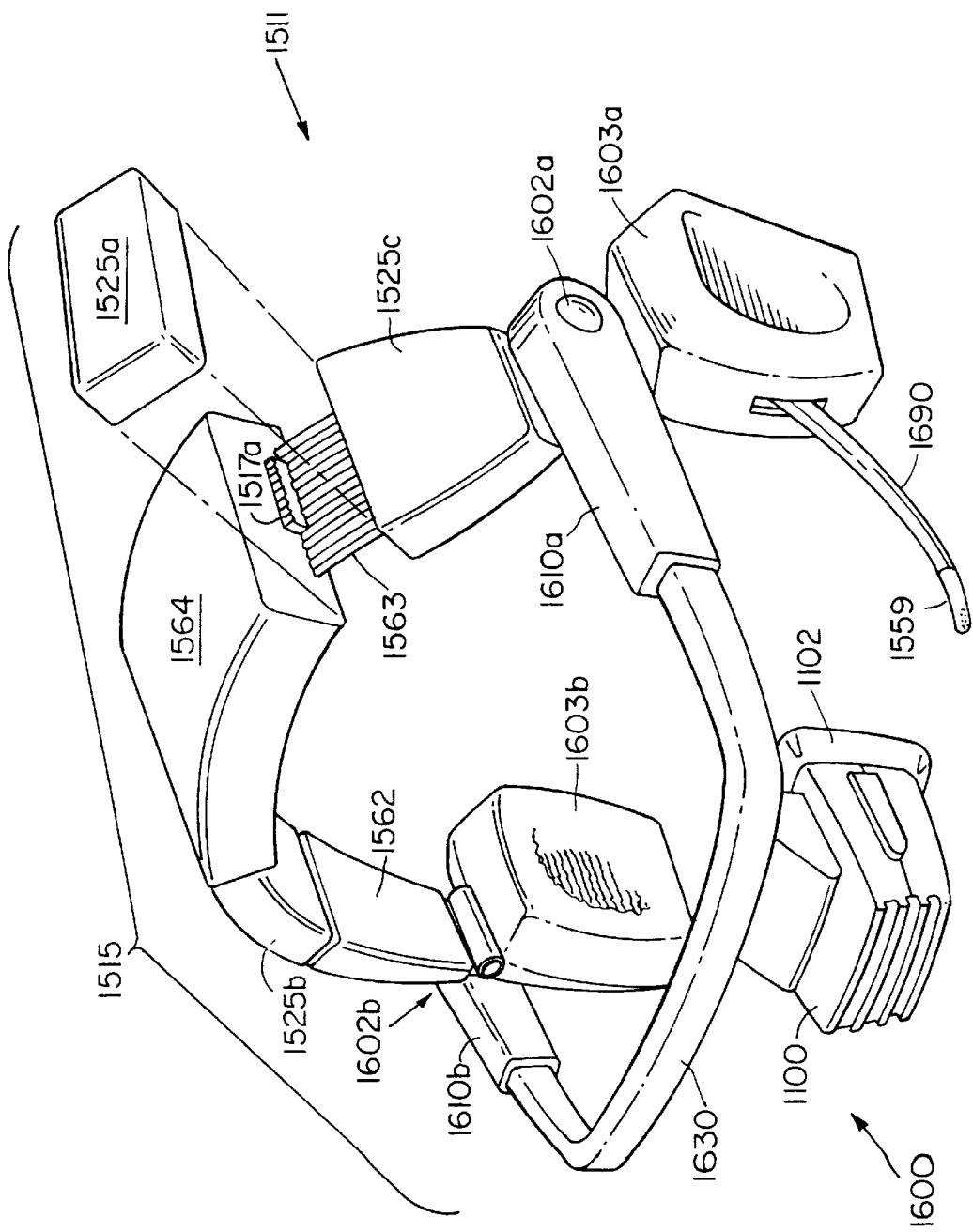

FIG. 29A is a partial exploded perspective view of another head-mounted computer 1511 in accordance with the present invention. The head band 1515 includes a CPU, a disk drive 1564 and expansion modules 1525*a*, 1525*b*, 1525*c* all interconnected together by a flexible bus 1563. Each module 1562, 1564, 1525*a*, 1525*b*, 1525*c* connects to the bus 1563 by a respective connector 1517*a*.

Also shown in FIG. 29A are earphones 1603*a*, 1603*b* for providing audio information to the wearer. Attached to one of the earphones is a microphone arm 1690 having a microphone 1559 at its distal end. The earphones 1603*a*, 1603*b* are hinged to the head band 1515 to provide a comfortable fit for the wearer.

A frame assembly 1600 is coupled to each end of the head band 1515 by a respective pin 1602*a*, 1602*b*. The pins 1602*a*, 1602*b* allow the frame assembly 1600 to be rotated up and over the head band 1515. In that position, the head-mounted computer 1511 is compactly stored and easy to carry.

The frame assembly 1600 includes a pair of distal arms 1610*a*, 1610*b* which are coupled to the head band 1512 by the pins 1602*a*, 1602*b*. A horizontal support 1630 telescopes out from the proximal arms 1610*a*, 1610*b* and around the forehead of the wearer. At least one display pod 1100 is mounted to the horizontal support 1630. As illustrated, a single display pod 1100 provides for monocular display. The display pod 1100 is preferably slidable along the horizontal frame 1630 for use with either the left or right eye of the wearer. The display pod 1100 includes an eye cup 1102.

FIG. 29B is a side elevation of the head-mounted computer 1511 of FIG. 29A.

FIG. 29C is a perspective view of the head-mounted computer 1511 of FIG. 29A with the frame assembly pivoted. The head-mounted computer 1511 can be worn in this position by a person or it can be stored or carried in this position.

FIG. 29D is a perspective view of the head-mounted computer 1511 of FIG. 29A worn by a wearer. The display pod 1100 is positioned for viewing before either eye and the microphone 1559 is positioned to receive voice signals.

Figure 30:
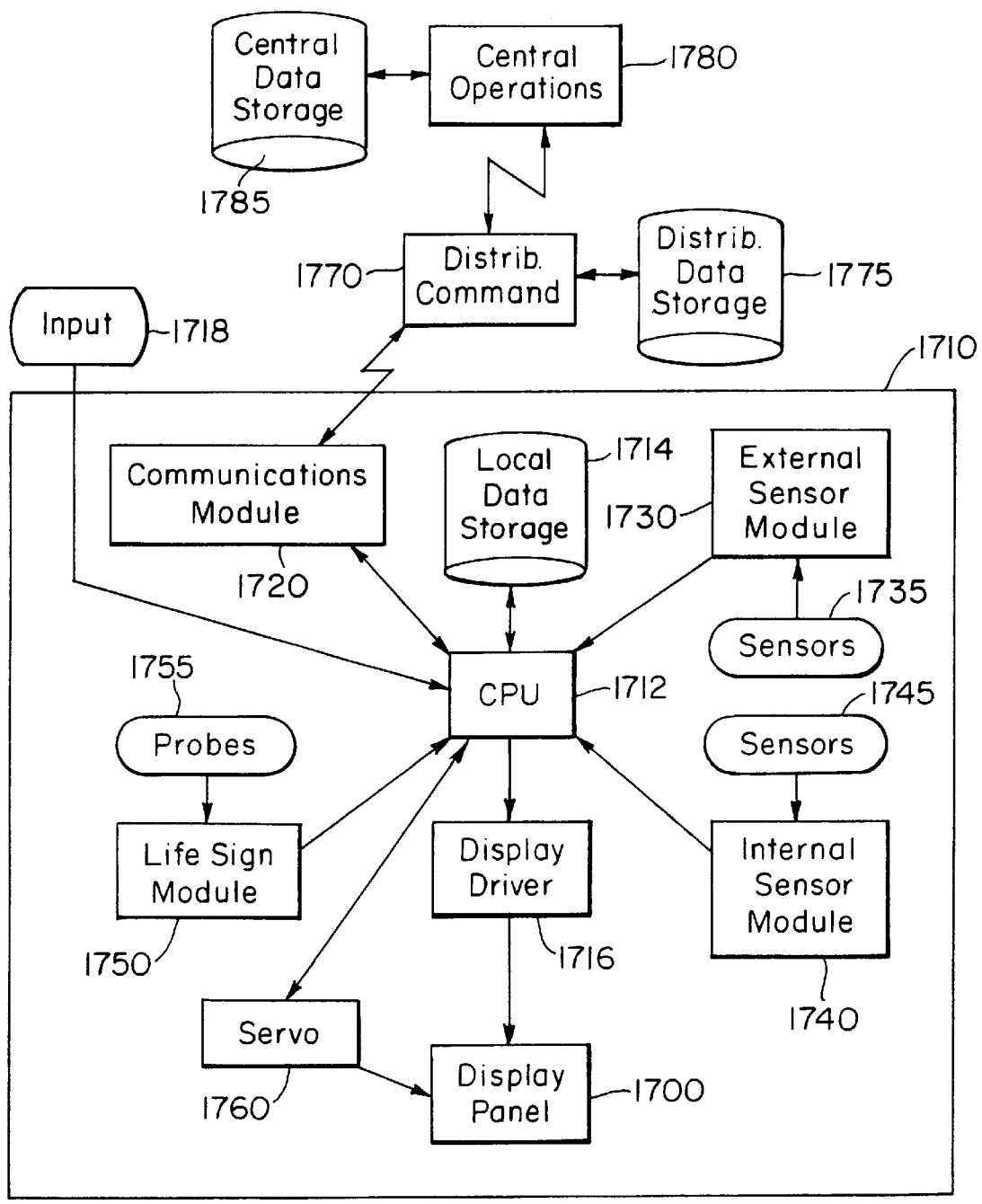
FIG. 30 is a schematic communications network for a head mounted color sequential display system.

FIG. 30 is a functional block diagram of a preferred head-mounted computer architecture according to the invention. The head-mounted computer 1710 includes a CPU 1712 having read and write access over the bus to a local data storage device 1714, which can be a floppy disk, a hard disk, a CD-ROM or other suitable mass storage devices. The CPU 1712 also drives a display driver 1716 to form images on the display panel 1700 for viewing by the wearer.

Either the head or body mounted platforms can house a memory modem or other expansion card 1558 (FIG. 28) conforming to the PCMCIA standards. These cards are restricted to fit within a rectangular space of about 55 mm in width, 85 mm in length, and 5 mm in depth.

A servo 1760 communicates with the CPU 1712 to vary the position of the display panel 1700 relative to the wearer's eyes. The servo 1760 is controlled by the wearer through an input device 1718. The servo 1760 operates a motor (not shown) to raise or lower the vertical position of the display panel 1700. Thus the display panel 1700 can be positioned so the wearer can glance up or down at the image without the display panel 1700 interfering with normal vision. Additionally, the display panel 1700 can be stowed outside the field of view. The CPU or display driver can be used to control color sequential system operation.

The CPU 1712 also sends and receives data from a communication module 1720 for interfacing with the outside world. Preferably, the communication module 1720 includes a wireless transducer for transmitting and receiving digital audio, video and data signals. A communication module 1720 can also include a cellular telephone connection. The communication module 1720 can likewise interface directly with the Plain Old Telephone Service (POTS) for normal voice, facsimile or modem communications. The communication module 1720 can include a tuner to receive over-the-air radio and television broadcasts.

The CPU 1712 can also receive and process data from an external sensor module 1730. The external sensor module 1730 receives data signals from sensors 1735, which provide data representing the external environment around the wearer. Such sensors are particularly important where the wearer is encased in protective gear.

When the wearer is clothed in protective gear, an internal sensor module 1740 can receive sensor data from sensors 1745 within the protective gear. The data from the internal sensors 1745 provide information regarding the wearer's local environment. In particular, the internal sensors 1745 can warn the wearer of a breach or failure of the protective gear.

In addition, the CPU 1712 can also receive data from a life sign module 1750. The life sign module 1750 receives data from probes 1755 implanted in or attached to the wearer. The life sign data from the probes 1755 provides the CPU 1712 with information regarding the wearer's bodily condition so that corrective actions can be taken.

The sensor modules 1730, 1740, 1750 receive data from associated detectors and format the data for transmission over a bus to the CPU 1712. The sensor modules can also filter or otherwise preprocess the data before transmitting the preprocessed data to the CPU 1712. Thus, each expansion module can contain a microprocessor.

The wearer can control the operation of the CPU 1712 through the input device 1718. The input device 1718 can include a keyboard, a mouse, a joystick, a pen, a track ball, a microphone for voice activated commands, a virtual reality data glove, an eyetracker, or other suitable input devices. A preferred eyetracker is described in U.S. Pat. No. 5,331,149 (issued Jul. 19, 1994), the teachings of which are incorporated herein by reference. In a particular preferred embodiment of the invention, the input device 1718 is a portable collapsible keyboard. Alternatively, the input device 1718 is a wrist-mounted keypad.

As illustrated, the head-mounted computer 1710 is a node on a distributed computing network. The head-mounted computer 1710 is in communication with a distributed command computer 1770 via the communication module 1720. The distributed command computer 1770 has access to distributed data storage 1775 for providing audio, video and data signals to the head-mounted computer. The distributed command computer 1770 can also be in communication with a central operations computer 1780 having central data storage 1785. Such external networks can be particularly adapted to applications of the head-mounted display or may be general purpose distributed data networks.

Figure 31:
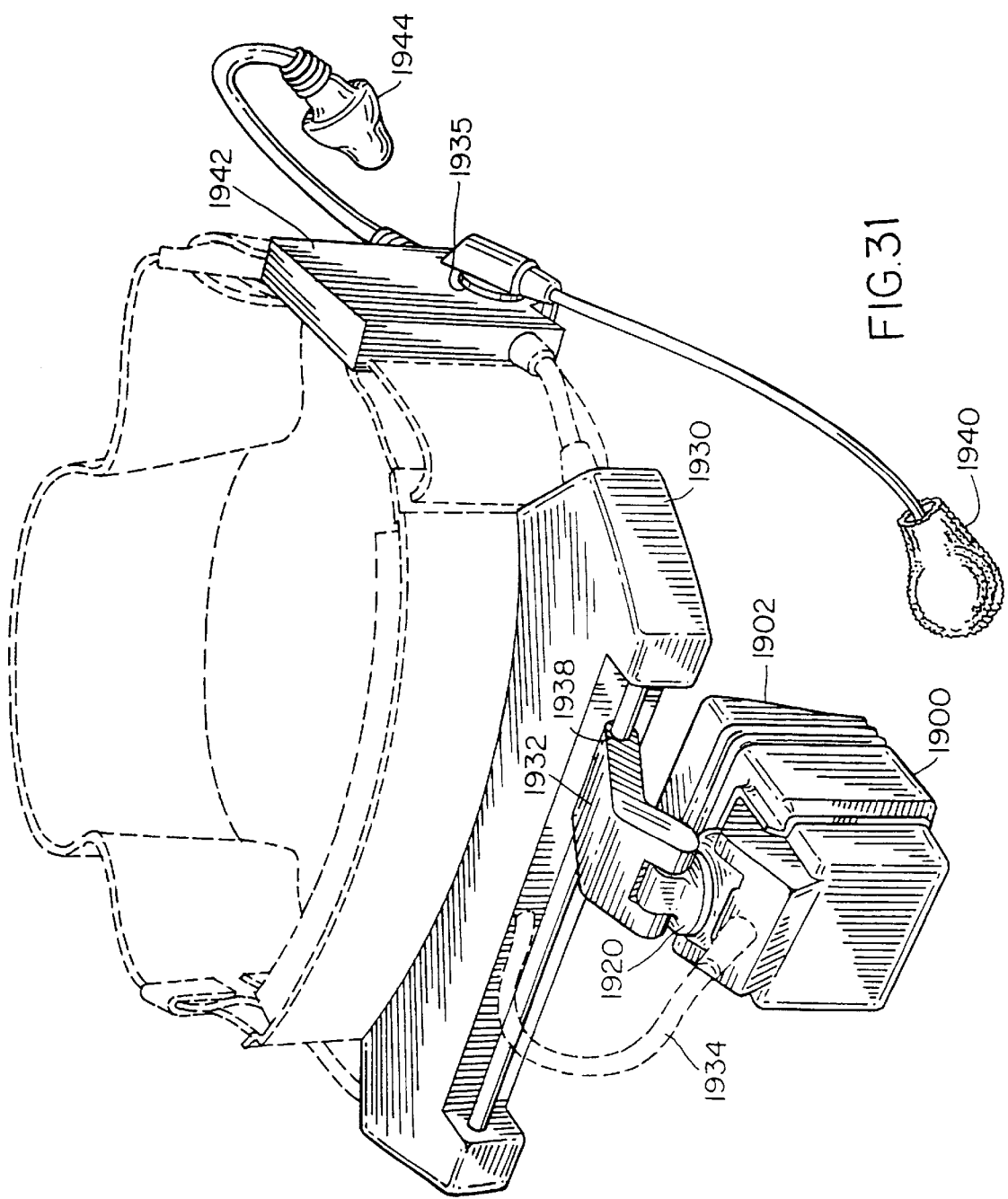
FIG. 31 is a perspective view of a head mounted color sequential display system.

FIG. 31 shows a detailed perspective view of a preferred embodiment of a monocular head mounted display. The display pod 1900 includes an eyecup 1902 that is fabricated from a pliable material. The pod can be turned by a wearer to adjust the vertical position of the display pod 1900 in the wearer's field of view. The wearer can also adjust the distance of the display pod 1900 from the wearer's eye, can swivel the pod relative to the visor at pivoting connector 1920, or can tilt the pod up by the wearer out of the field of view. The visor 1930 can also house the video interface circuitry including the color sequential drive circuitry, as well as the circuit harness for the display which can be connected either through the arm 1932 suspending the pod at hinge 1938 or through optional cable 1934. A microphone 1940 can be connected to the visor 1930 or to an audio unit 1942 by a connector 1935 and where input cable (not shown) can be connected on the opposite side. An earplug 1944 can also be connected to the other unit 1942.

The display pod can be positioned against a user's glasses, or against the eye, or retracted above the eye, or pressed against the visor.

Figure 32:
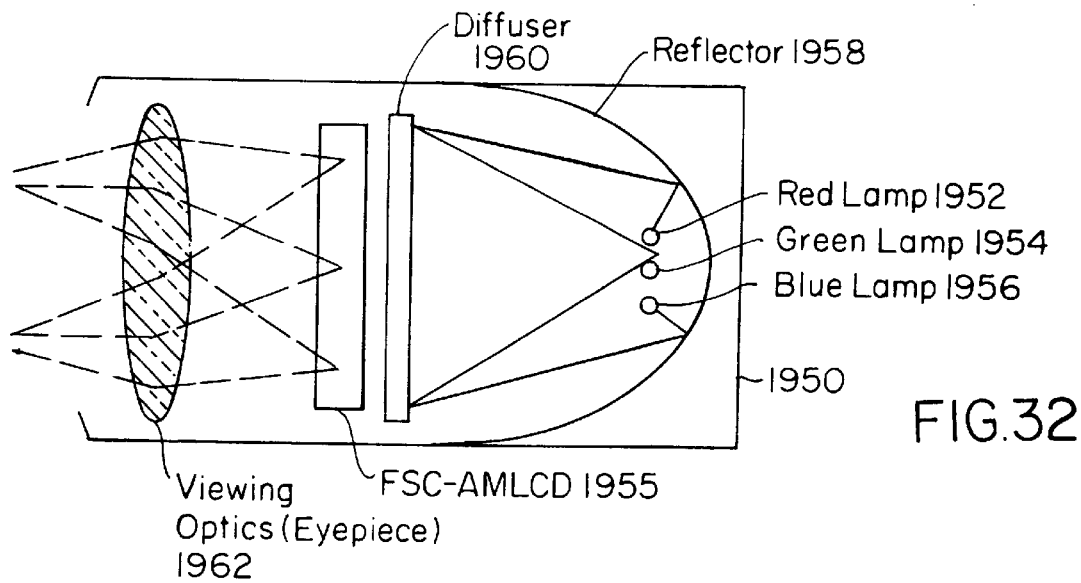
FIG. 32 is a schematic view of the eye-piece module for a color sequential head mounted system.

The display pod 1900 can include several different color sequential optical systems. FIG. 32 illustrates another preferred embodiment utilizing three different color lamps 1952, 1954, 1956 a reflector 1958, a diffuser 1960, and active matrix liquid crystal display 1955 and lens 1962.

The active matrix and liquid crystal displays fabricated and used in conjunction with the color sequential systems described herein can be made using a transferred silicon process.

Figure 33:
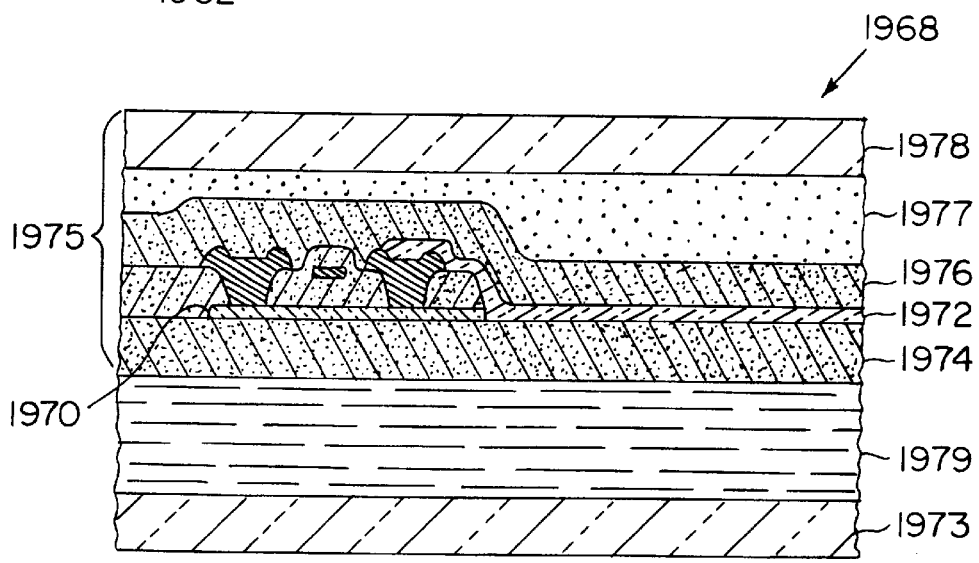
FIG. 33 is a cross-sectional view of a transferred silicon active matrix liquid crystal display.

FIG. 33 illustrates a partial cross-sectional view of a transferred silicon active matrix liquid crystal display which 1968 includes a transistor formed with a thin film single crystal silicon layer 1970 over an insulating substrate 1974. The areas or regions of the circuit in which pixel electrodes 1972 are formed with silicon or can be formed by subjecting the area to a silicon etch to expose the underlying oxide followed by deposition of the transparent conductive pixel electrode 1972 on or over the exposed oxide with a portion of the deposited electrode extending up the transistor sidewall to the contact metalization of the transistor sidewall to the contact metalization of the transistor. A passivation layer 1976 is then formed over the entire device, which is then transferred to a optically transparent substrate 1978. A transparent adhesive 1977 is used to secure the circuit to the substrate 1978. The composite structure 1975 is then attached to a counterelectrode 1973 and polarization elements (not shown) and a liquid crystal material 1979 is then inserted into the cavity formed between the oxide layer 1974 and the counterelectrode 1973.

Figure 34:
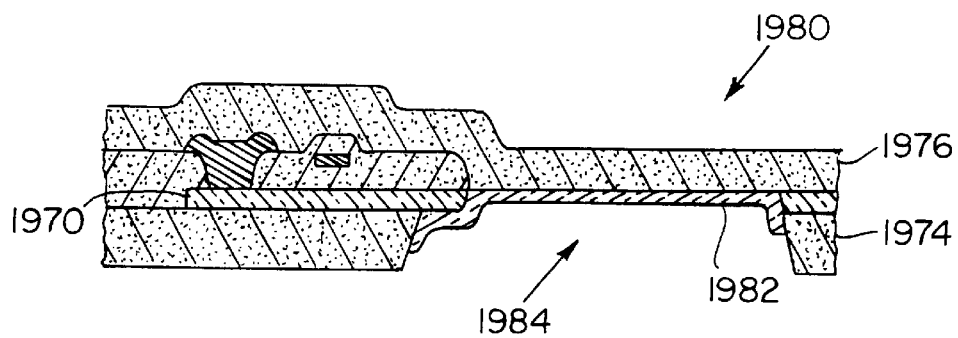
FIG. 34 is a partial cross-sectional view of an active matrix display circuit with a preferred pixel structure for a color sequential system.

A further embodiment 1980 of the display is fabricated in a manner similar to that described in FIG. 33, but which employs a different pixel electrode and insulator structure is shown in FIG. 34. This involves exposing a portion of the single crystal silicon layer in which the transistor circuit is formed by removing the exposed portion through openings 1984 in the insulator 1974 after transfer (substrate 1978 and adhesive 1977 not shown) to form the structure shown in FIG. 34. The conductive transparent electrode 1982 is formed as shown that can directly contact the transistor circuit at a contact area or the exposed silicon can be treated prior to contact formation as described previously. A further optional passivation layer (not shown) can also be added to cover the pixel electrode 1982 to provide electrical isolation, and planarization of the pixel area. The circuit can then be packaged with the liquid crystal material to form the display. The circuits can also be used to form a active matrix electroluminescent displays as described in U.S. Ser. No. 07/943,896, filed on Sep. 11, 1992, the contents of which are incorporated herein by reference. Instead of color filters, however, a color sequential system such as that described in connection with FIG. 9 and FIG. 10 herein can be mounted onto the circuit and driven by the necessary control circuit for color sequential operation.

Equivalents

Those skilled in the art will know, or be able to ascertain using no more than routine experimentation, many equivalents to the specific embodiments of the invention described herein. These and all other equivalents are intended to be encompassed by the following claims.

The invention claimed is:

1. A sequential color display for a communications device comprising:
   a wireless transceiver that receives image data;
   a light source comprising a plurality of light emitting devices (LEDS) that emit a plurality of different colors;
   a display panel optically coupled to the light source, the display panel including an array of pixel electrodes and an array of pixel circuits, each pixel circuit being formed with a single crystal silicon material; and
   a sequential color circuit connected to the display panel and the light source such that the light source generates a plurality of colors in temporal sequence, the sequential color circuit controlling a sequence of image frames formed on the display panel from the received image data at a rate of 60 frames per second or more.

2. The device of claim 1 wherein the light emitting devices comprise red, green and blue LEDs.

3. The device of claim 1 wherein the device comprises a portable telephone.

4. The device of claim 1 further comprising a reflector around the light source.

5. The device of claim 1 further comprising a diffuser.

6. The device of claim 1 further comprising a lens that enlarges color images formed on the display panel.

7. The device of claim 1 wherein the display comprises an active matrix display.

8. The device of claim 1 further comprising a camera.

9. The device of claim 1 wherein the light source comprises a red, a green and a blue light source.

10. The device of claim 1 wherein the display and the sequential color circuit are positioned in a display module housing that is attached to a transceiver housing.

11. The device of claim 1 wherein the device comprises a head mounted display system.

12. The device of claim 1 further comprising a control processor connected to the sequential color circuit.

13. The device of claim 2 further comprising a memory connected to the control processor.

14. The device of claim 1 wherein the display comprises an active matrix circuit bonded to a transmissive substrate.

15. A method of displaying images with a portable communications device comprising:
- providing a matrix display panel having an array of pixel electrodes and pixel circuits, the pixel circuits being formed with a single crystal silicon material;
- providing a light source including a plurality of light emitting devices (LEDs) emitting light of a plurality of different colors;
- receiving image data with a wireless transceiver;
- generating a plurality of image subframes from the received image data for each color image frame at a rate of 60 frames per second or more, each subframe having a different color; and
- displaying each subframe in temporal sequence on the matrix display panel using the light source to display a color image frame.

16. The method of claim 15 further comprising providing a portable telephone housing that contains the transceiver.

17. The method of claim 16 further comprising providing a display housing that houses the display, the display housing being pivotably connected to the telephone housing.

18. The method of claim 15 further comprising the step of providing an active matrix liquid crystal display panel.

19. A portable communications device comprising:
- a wireless transceiver that receives image data;
- a light source including a plurality of light emitting devices (LEDs) emitting a plurality of different colors;
- a liquid crystal display panel optically coupled to the light source, the display panel including an active matrix circuit formed with a single crystal silicon material; and
- a sequential color circuit connected to the display panel and the light source such that the light source generates a plurality of colors in sequence to illuminate the display panel at a rate of 60 frames per second or more.

20. The device of claim 19 wherein the liquid crystal display panel is connected to a camera mounted ona device housing.

* * * * *